US012737929B2

(12) United States Patent
Kim et al.

(10) Patent No.: US 12,737,929 B2
(45) Date of Patent: Sep. 15, 2026

(54) VEHICLE USER INTERFACE DEVICE AND OPERATING METHOD OF VEHICLE USER INTERFACE DEVICE

(71) Applicant: LG Electronics Inc., Seoul (KR)

(72) Inventors: Ilwan Kim, Seoul (KR); Jaeho Lee, Seoul (KR); Sunghwan Choi, Seoul (KR); Dukyung Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 479 days.

(21) Appl. No.: 18/198,608

(22) Filed: May 17, 2023

(65) Prior Publication Data

US 2023/0290015 A1 Sep. 14, 2023

Related U.S. Application Data

(63) Continuation of application No. 17/278,480, filed as application No. PCT/KR2018/011334 on Sep. 21, 2018, now Pat. No. 11,694,369.

(51) Int. Cl.

| | |
|---|---|
| ***B60K 35/22*** | (2024.01) |
| ***B60K 35/10*** | (2024.01) |
| ***B60K 35/23*** | (2024.01) |
| ***B60K 35/25*** | (2024.01) |
| ***B60K 35/26*** | (2024.01) |
| ***B60K 35/28*** | (2024.01) |
| ***B60K 35/29*** | (2024.01) |
| ***B60K 35/80*** | (2024.01) |
| ***G06F 3/14*** | (2006.01) |
| ***G06T 11/00*** | (2006.01) |

(52) U.S. Cl.

CPC .............. *G06T 11/00* (2013.01); *B60K 35/10* (2024.01); *B60K 35/22* (2024.01); *B60K 35/23* (2024.01); *B60K 35/25* (2024.01); *B60K 35/265* (2024.01); *B60K 35/28* (2024.01); *B60K 35/29* (2024.01); *B60K 35/80* (2024.01); *G06F 3/14* (2013.01); *B60K 2360/143* (2024.01); *B60K 2360/146* (2024.01); *B60K 2360/148* (2024.01); *B60K 2360/177* (2024.01)

(58) Field of Classification Search

None

See application file for complete search history.

(56) References Cited

U.S. PATENT DOCUMENTS

| | | | | |
|---|---|---|---|---|
| 9,691,281 B2 * | 6/2017 | Feng | G01C 21/3647 | |
| 2002/0032524 A1 * | 3/2002 | Hulverscheidt | G01C 21/3632 | 340/995.1 |
| 2009/0132162 A1 * | 5/2009 | Kudoh | G08G 1/0969 | 701/533 |
| 2010/0292886 A1 * | 11/2010 | Szczerba | G01S 13/723 | 701/31.4 |
| 2010/0324817 A1 * | 12/2010 | Hansen | G01C 21/3632 | 701/414 |
| 2012/0259478 A1 * | 10/2012 | Schuerman | G06F 3/0679 | 701/1 |

(Continued)

*Primary Examiner* — David H Chu
(74) *Attorney, Agent, or Firm* — Fish & Richardson P.C.

(57) ABSTRACT

The present invention relates to a vehicle user interface device including a display configured to display a first Augmented Reality (AR) graphic object at a point in a display area corresponding to a first point, and at least one processor configured to obtain distance data between a vehicle and the first point and change the first AR graphic object based on the distance data.

34 Claims, 28 Drawing Sheets

(56) References Cited

U.S. PATENT DOCUMENTS

| | | | | |
|---|---|---|---|---|
| 2015/0185039 | A1* | 7/2015 | Milicic | G01C 21/3658 701/437 |
| 2016/0231134 | A1* | 8/2016 | Nguyen Kim | G06T 13/20 |
| 2017/0343374 | A1* | 11/2017 | Yi | G06V 20/588 |
| 2018/0130244 | A1* | 5/2018 | Liang | G06T 11/60 |
| 2018/0164115 | A1* | 6/2018 | Chiu | G01C 21/3602 |
| 2019/0025580 | A1* | 1/2019 | Nagano | G02B 27/01 |
| 2019/0087668 | A1* | 3/2019 | Kim | G06V 20/58 |
| 2019/0226866 | A1* | 7/2019 | Chang | G06V 20/20 |
| 2022/0390251 | A1* | 12/2022 | Suzuki | B60Q 1/34 |
| 2023/0021643 | A1* | 1/2023 | Neumann | G08G 1/0969 |
| 2023/0150360 | A1* | 5/2023 | Kim | B60K 35/28 701/36 |
| 2023/0400320 | A1* | 12/2023 | Choi | G01C 21/3647 |

* cited by examiner

【FIG.1】
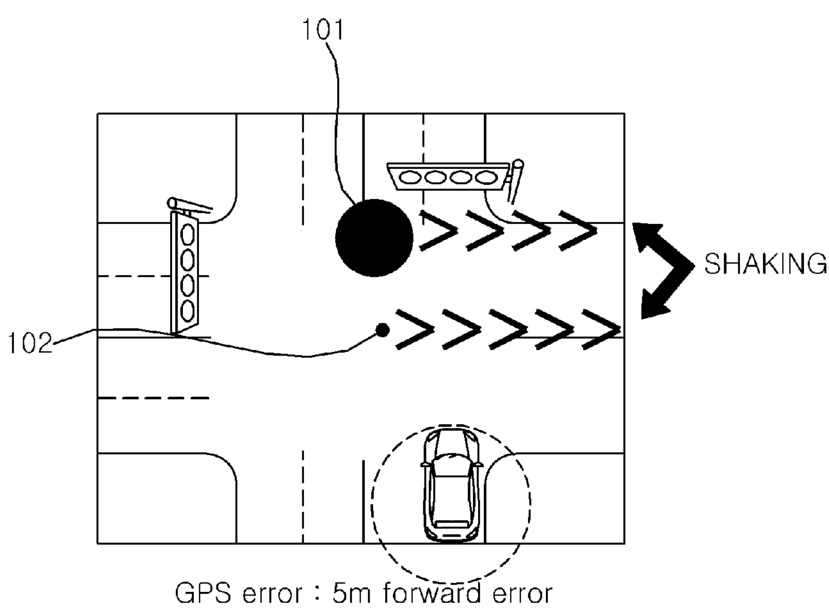
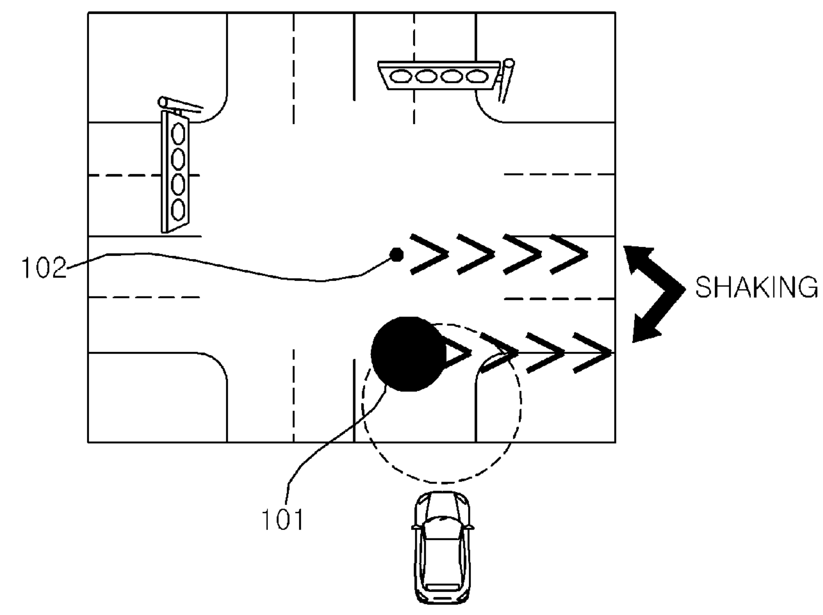

【FIG.2】
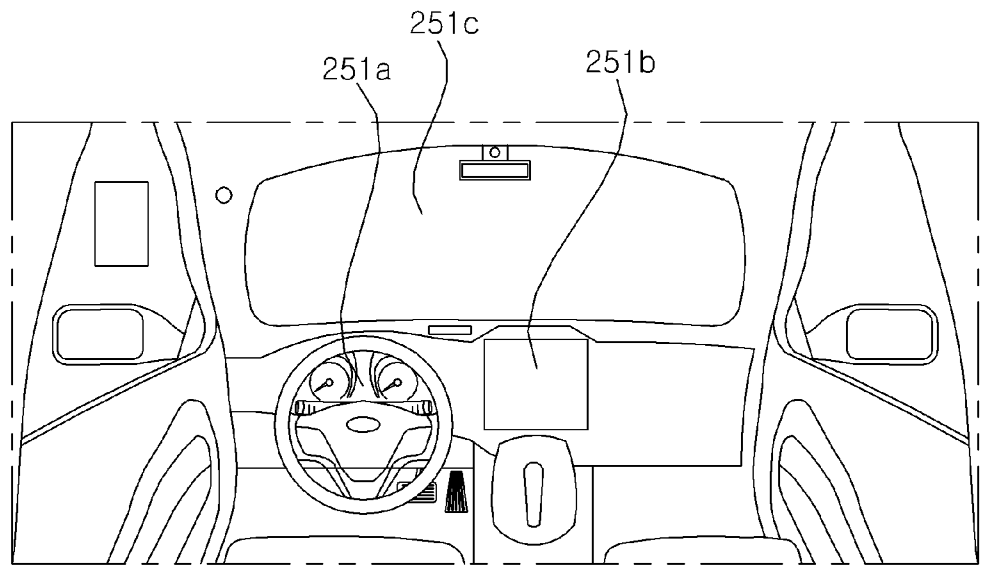

【FIG.3】
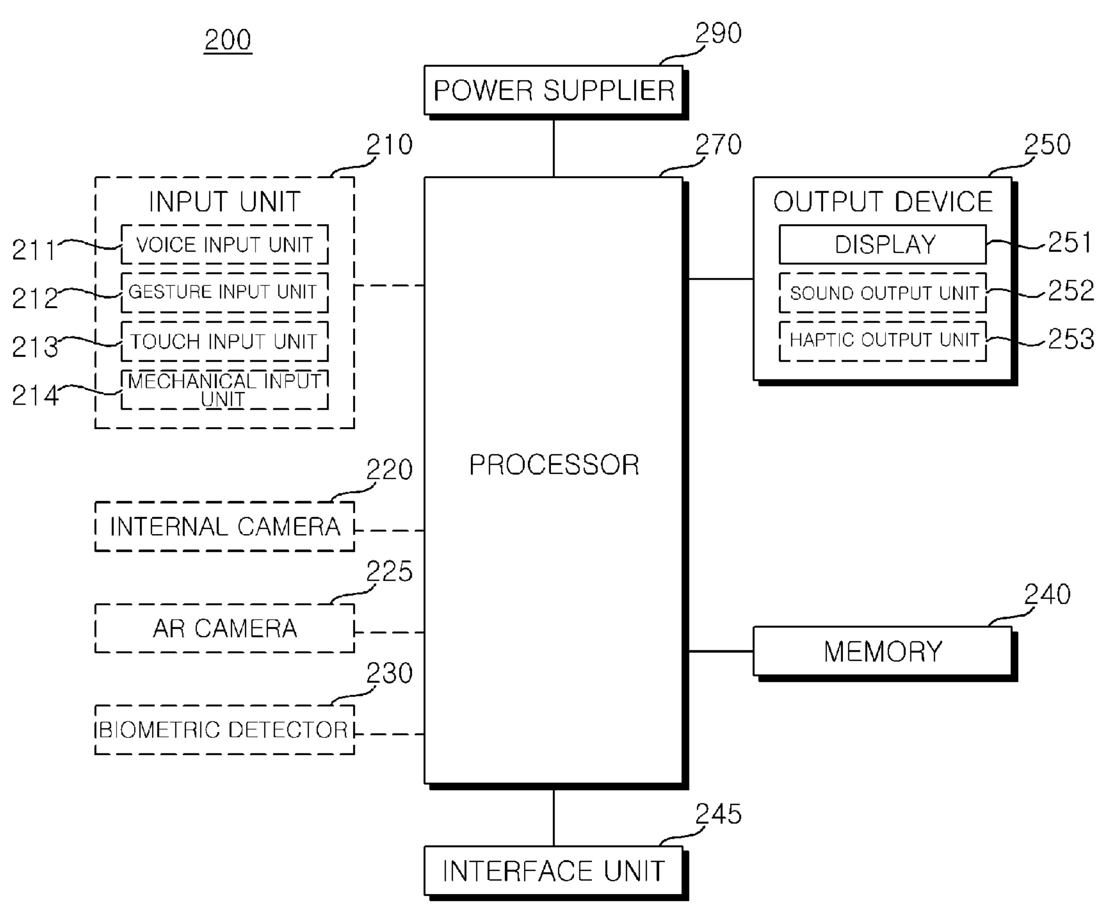

【FIG.4】
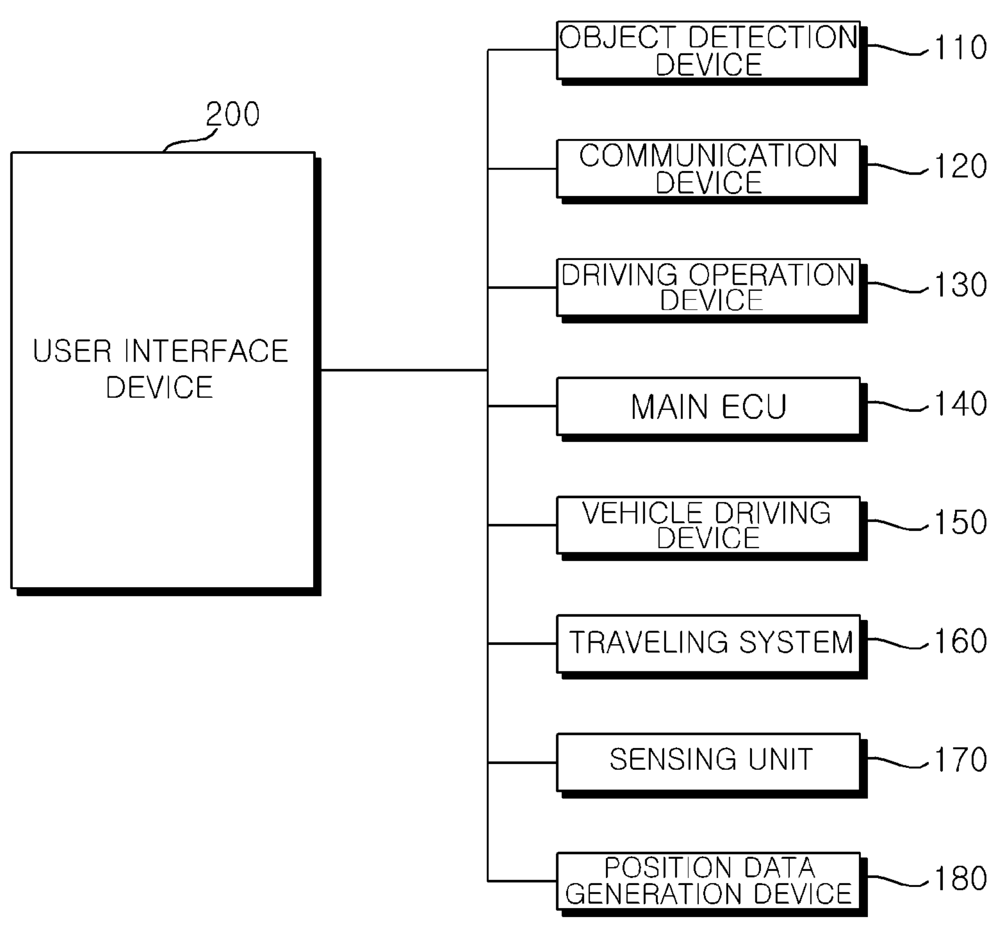

【FIG.5】
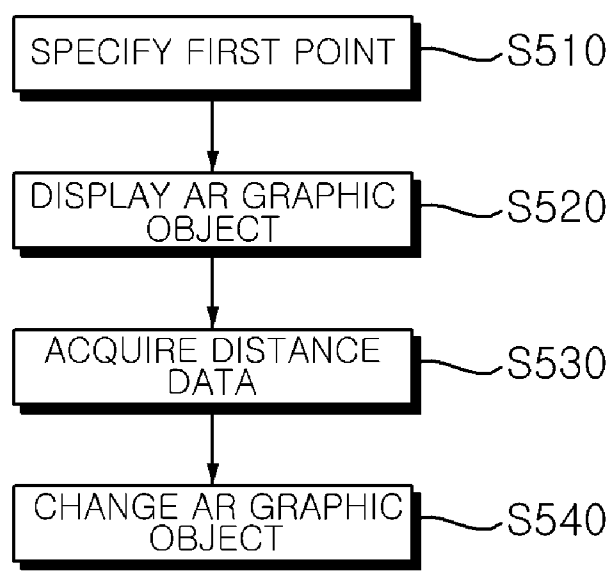

【FIG.6a】
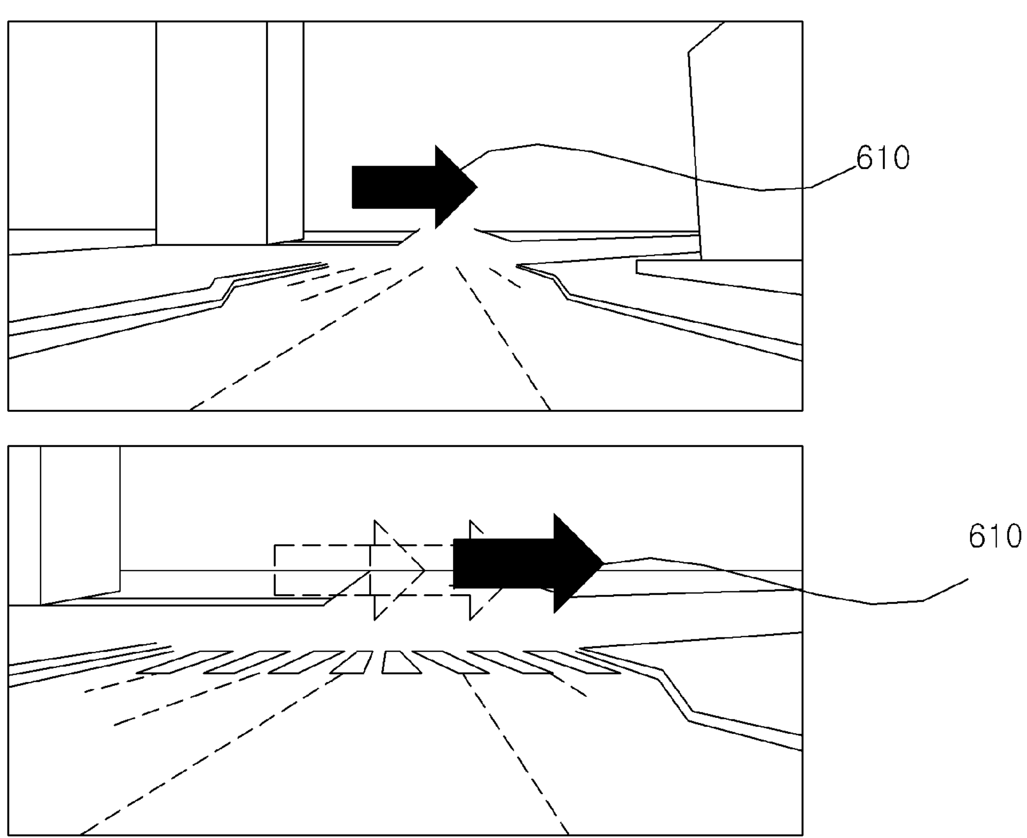

【FIG.6b】
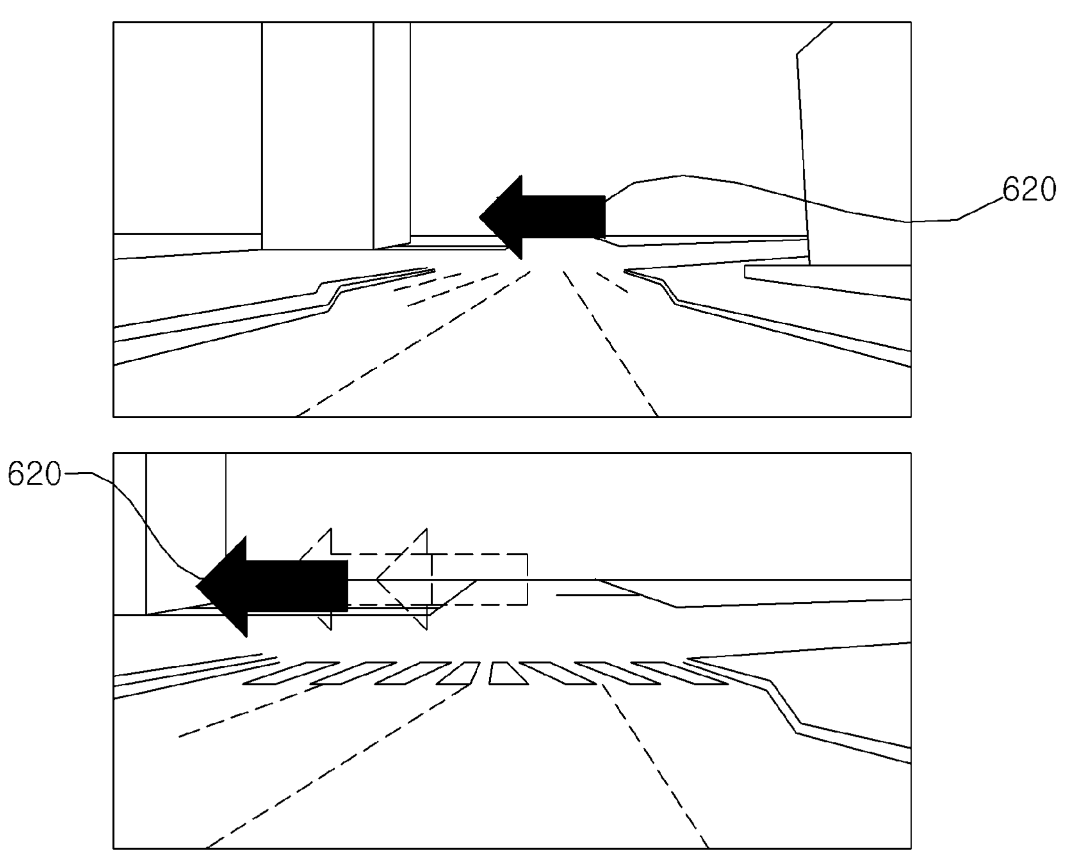

【FIG.7a】
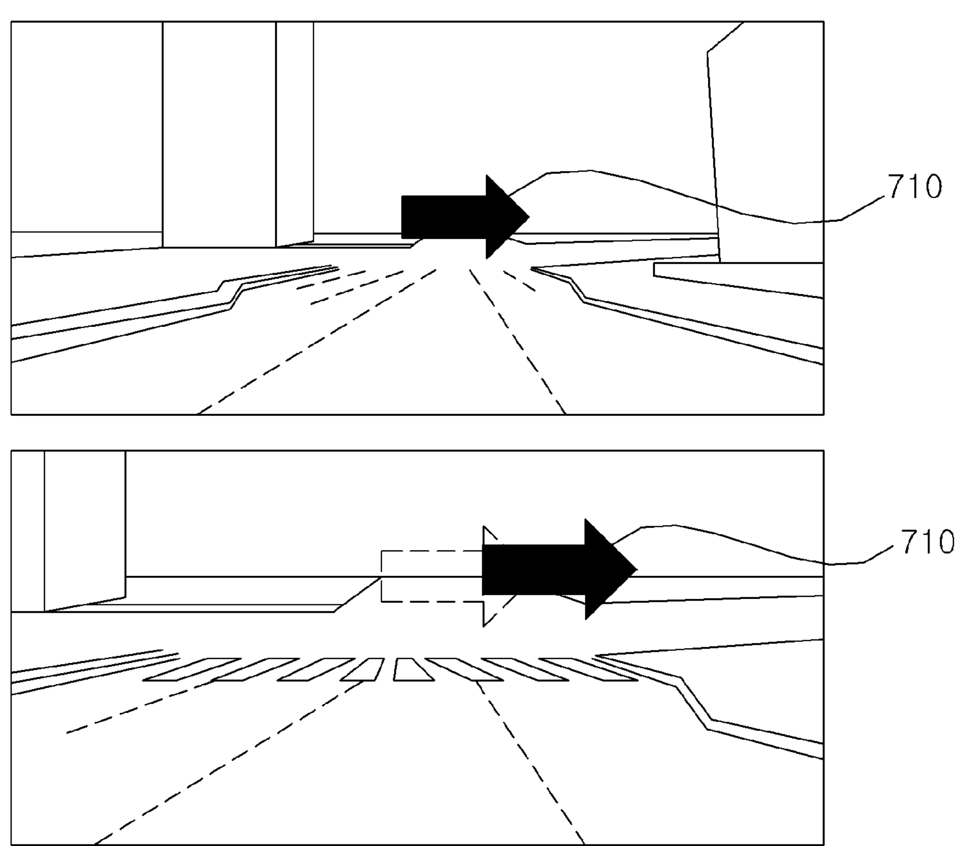

【FIG.7b】
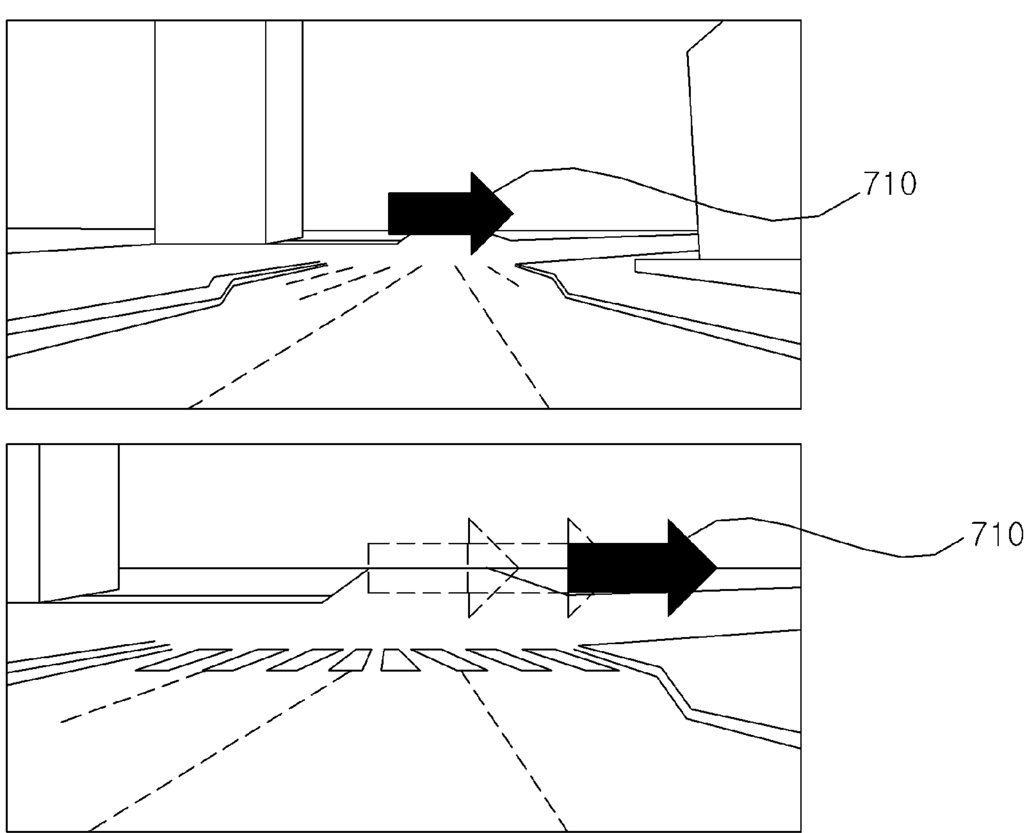

【FIG.8a】
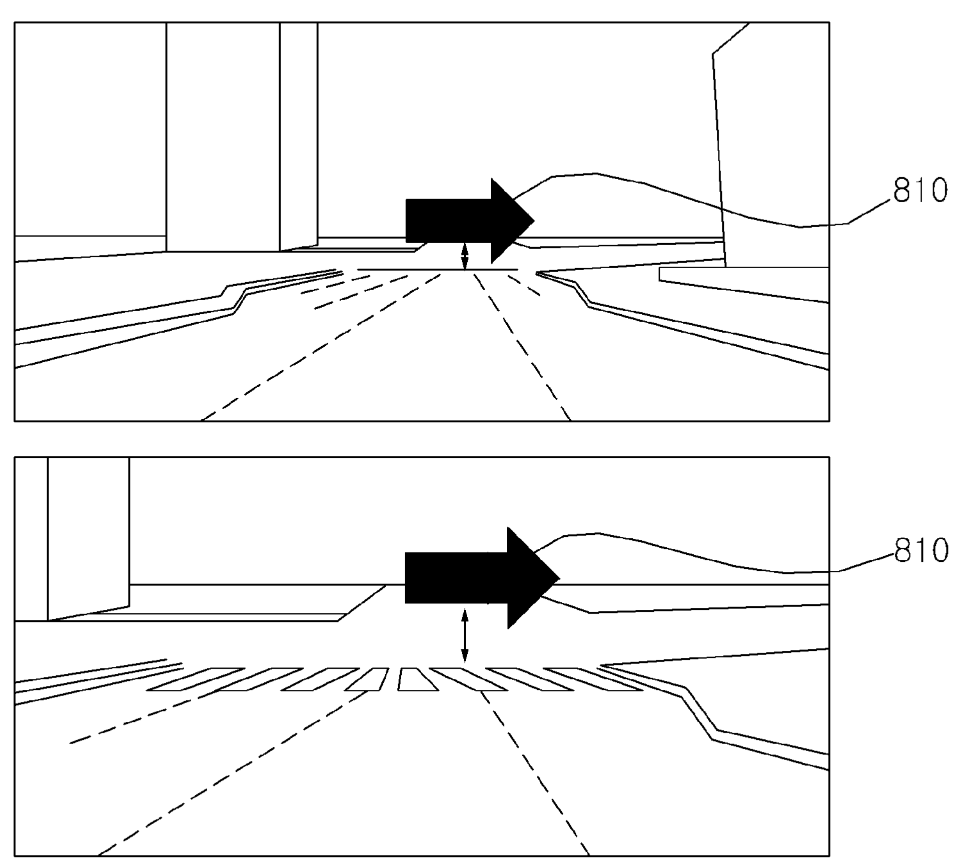

【FIG.8b】
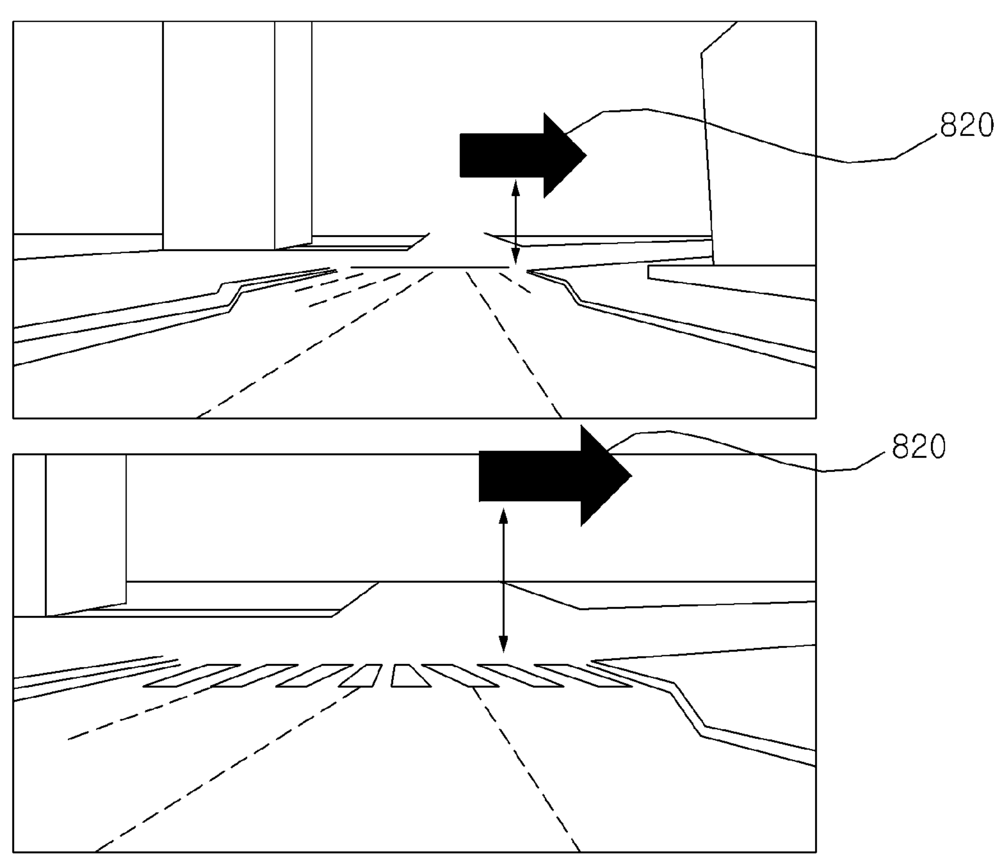

【FIG.9a】
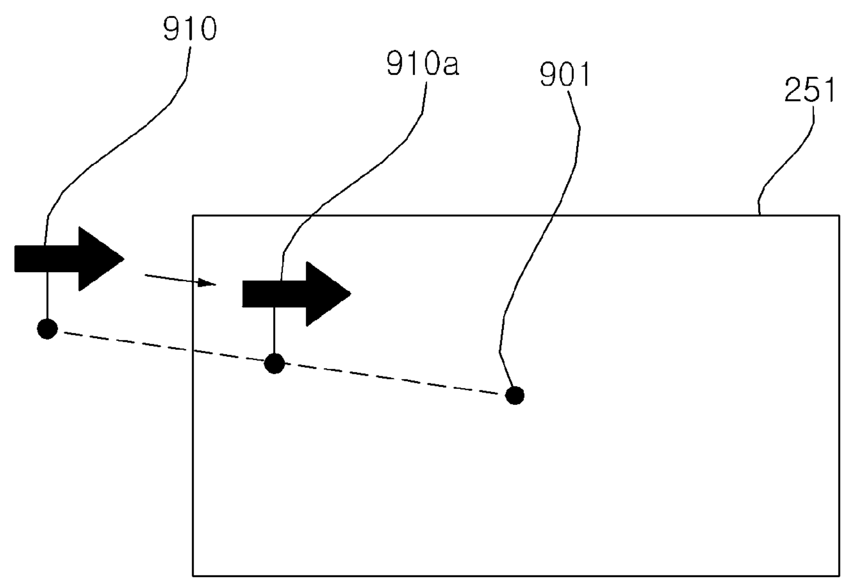

【FIG.9b】
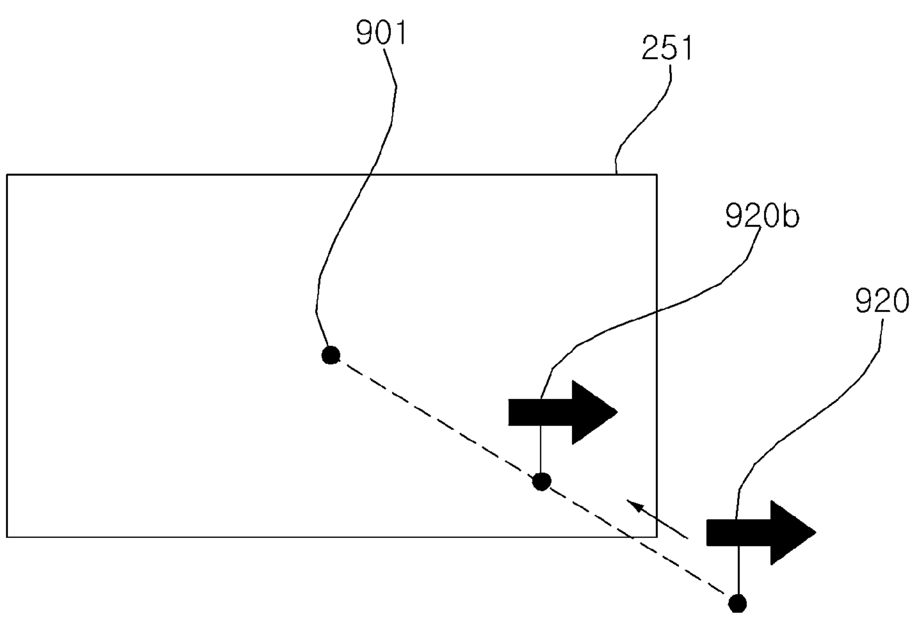

【FIG.10】
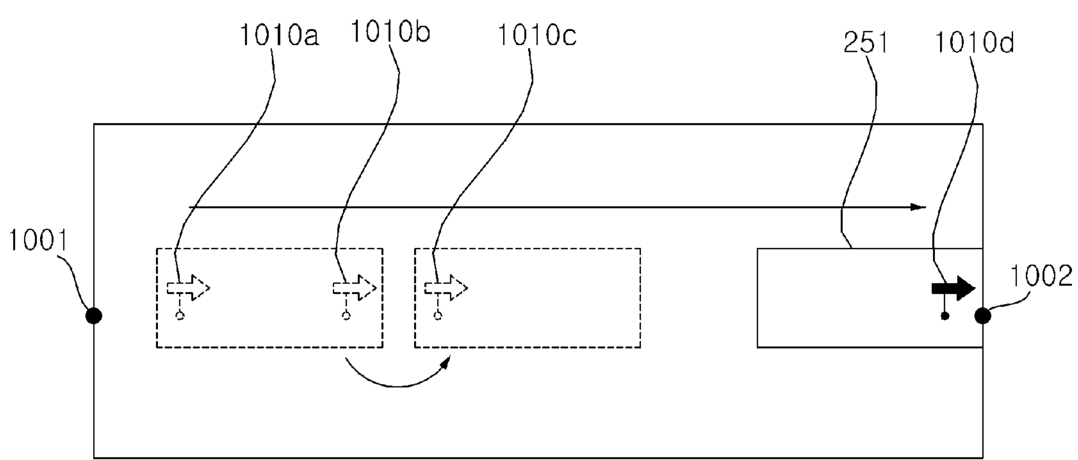

【FIG.11a】
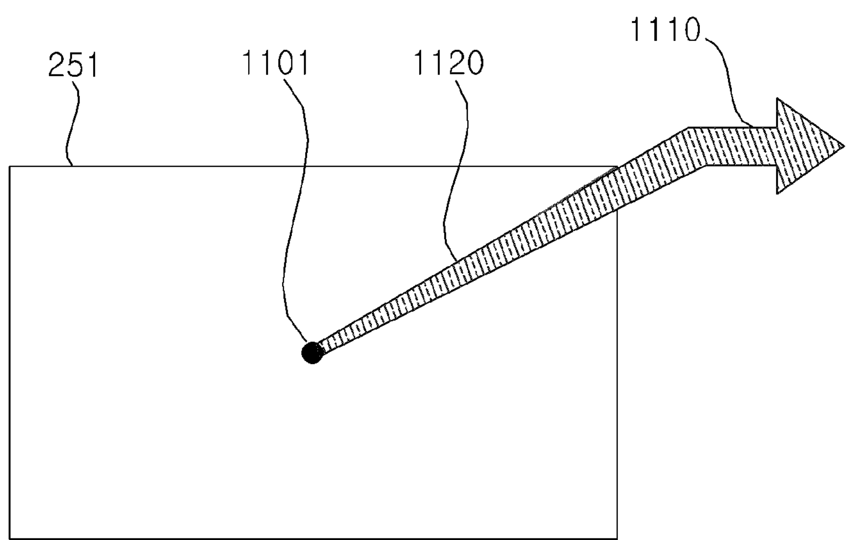

【FIG.11b】
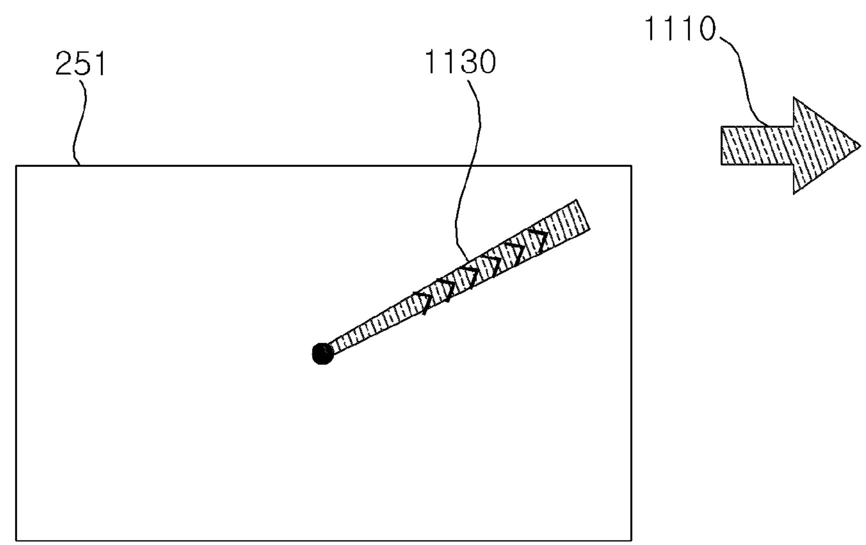

【FIG.12a】
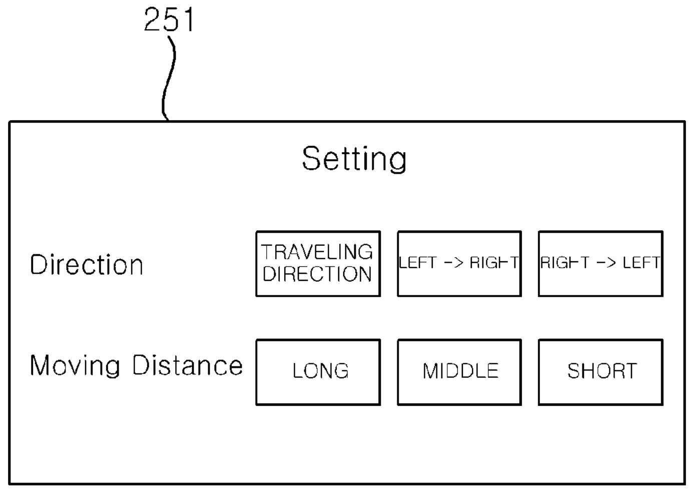
【FIG.12b】
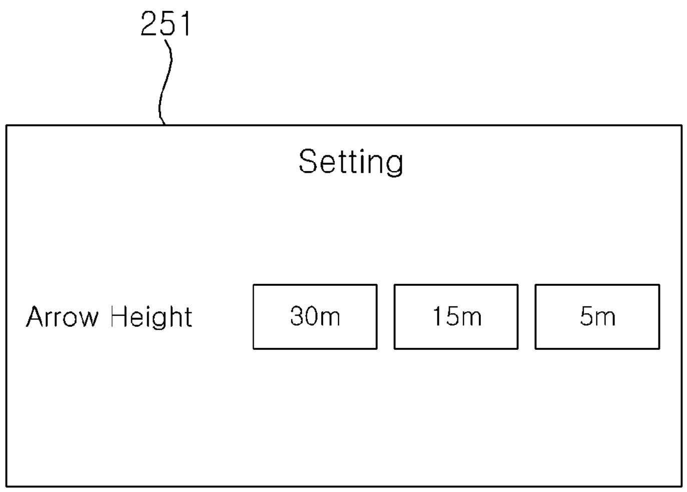

【FIG.13a】
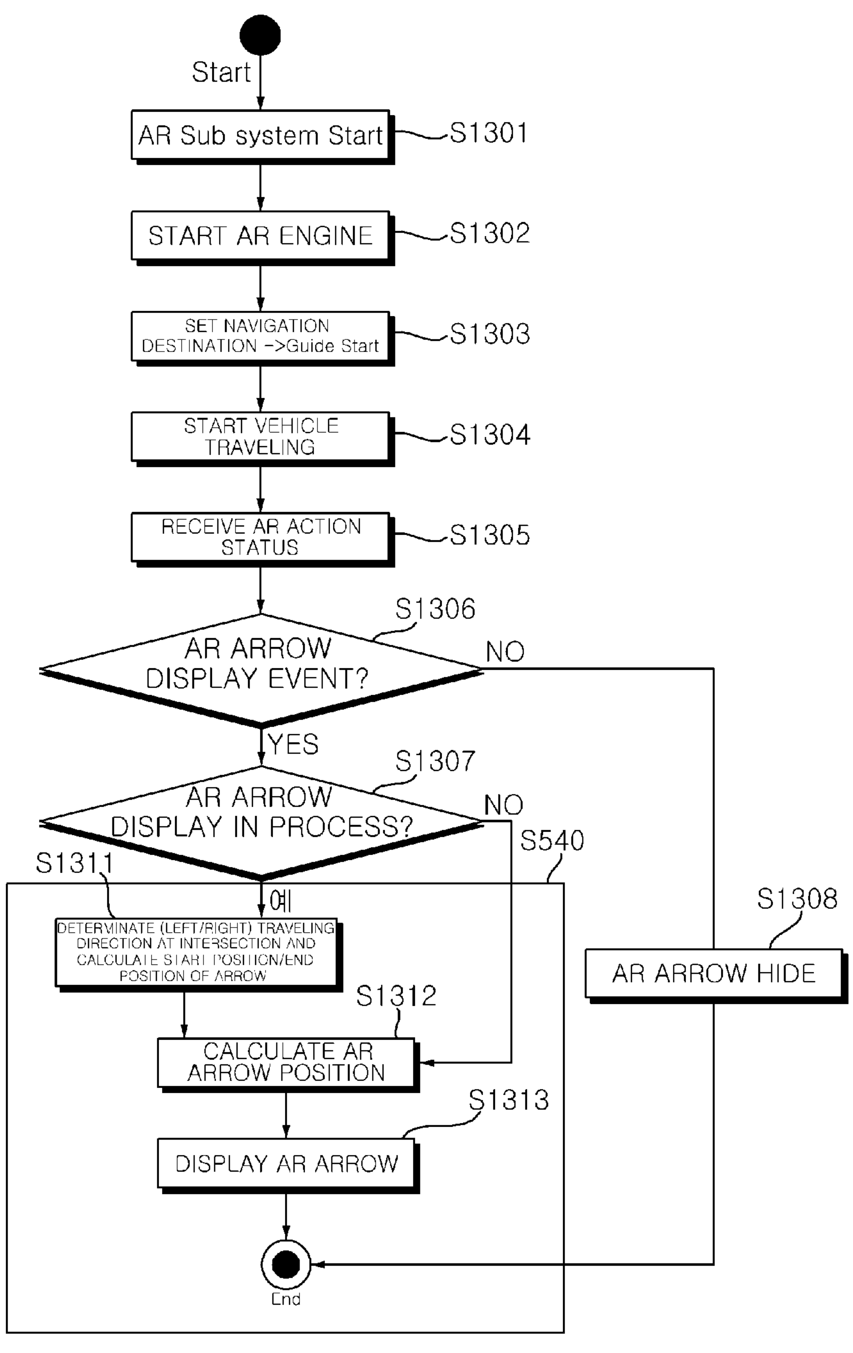

【FIG.13b】
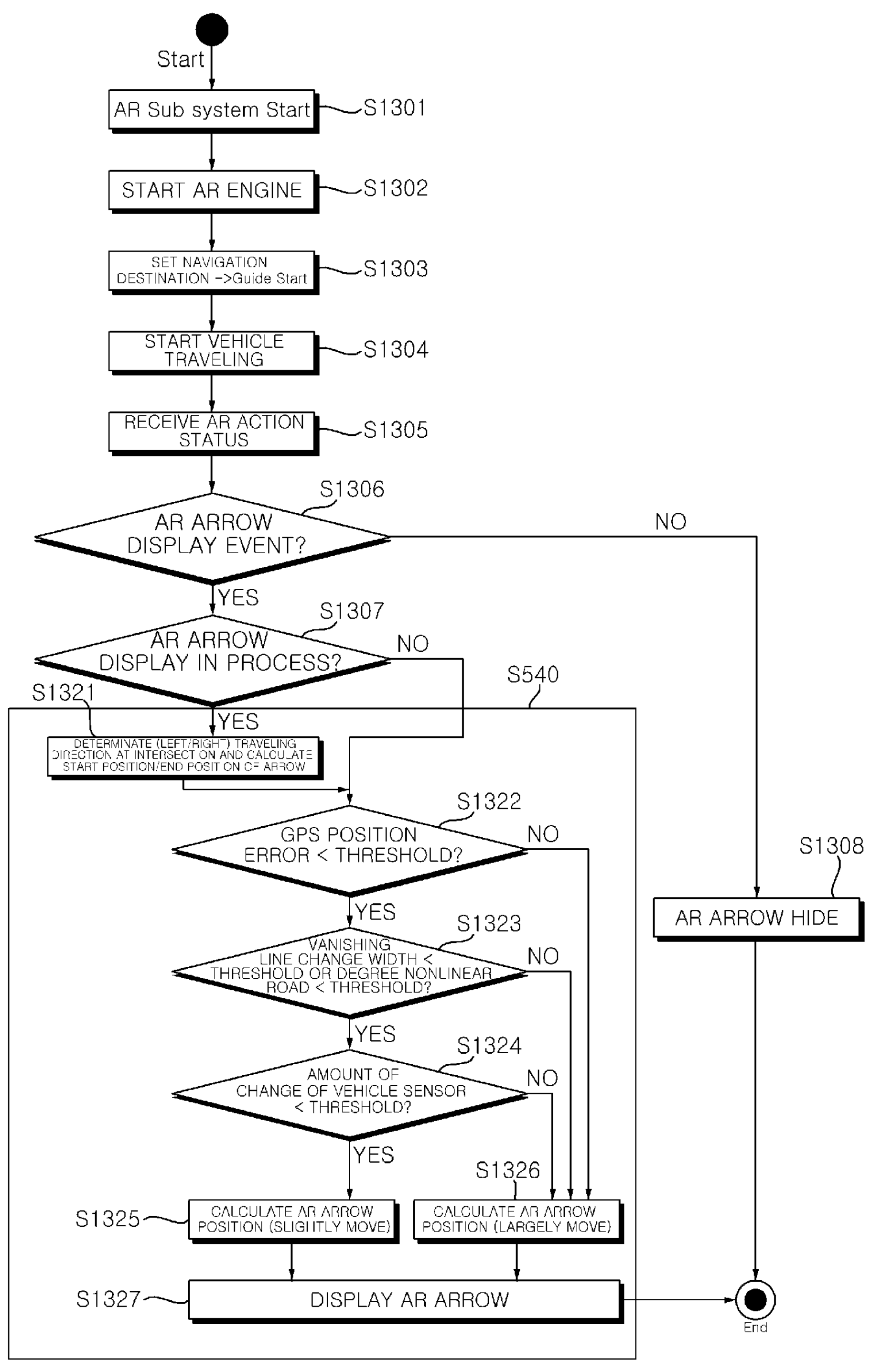

【FIG.13c】
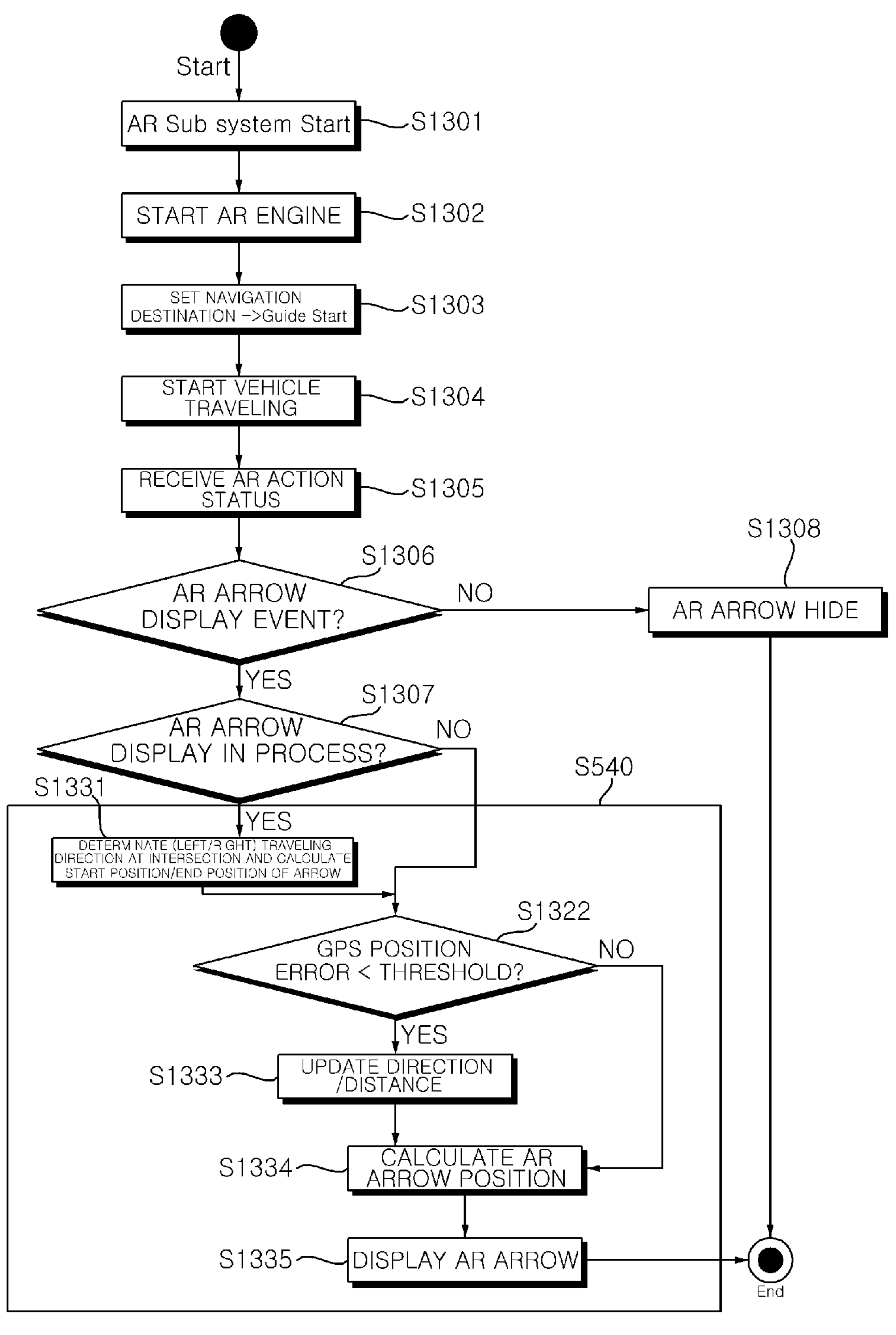

【FIG.13d】
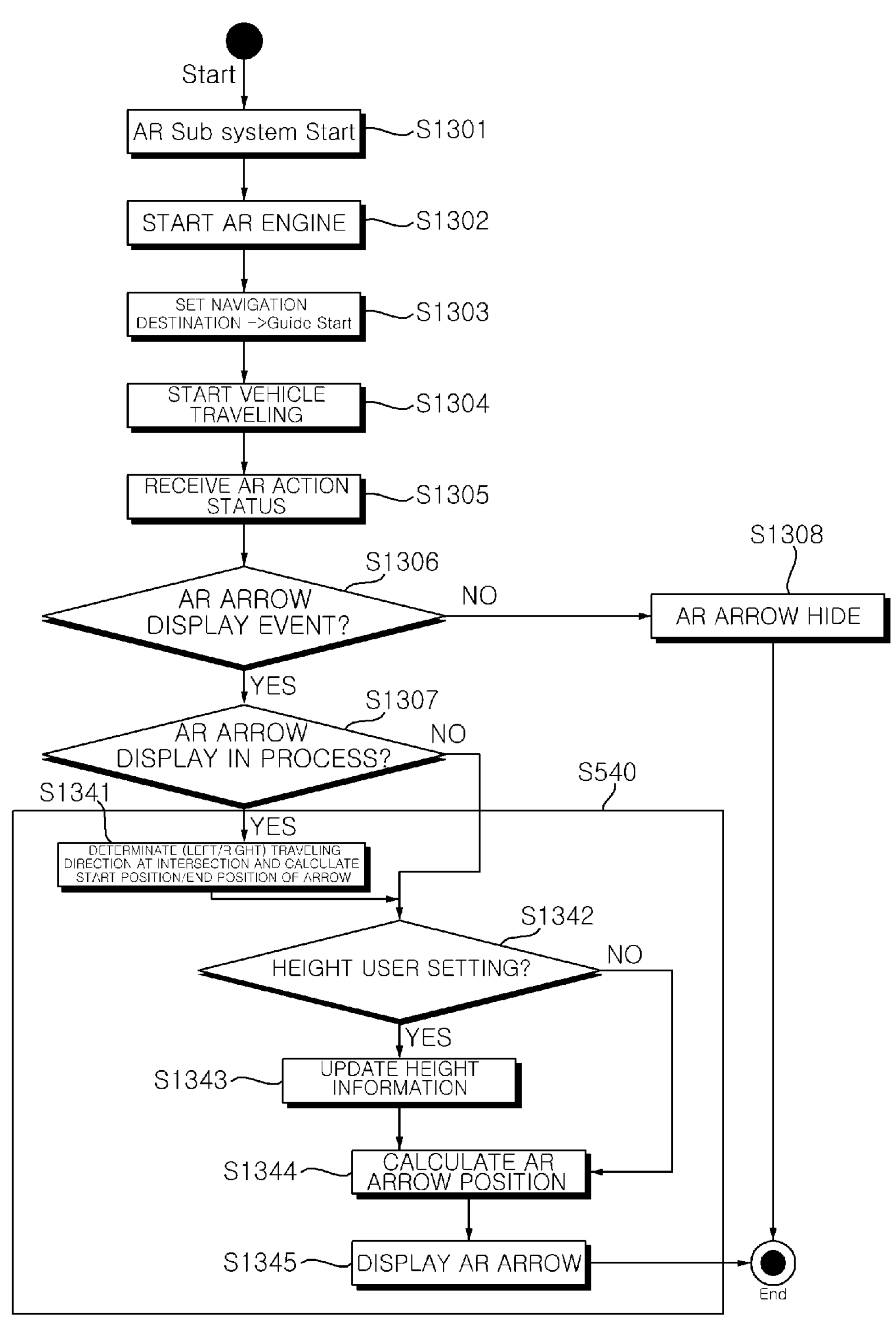

【FIG.13e】
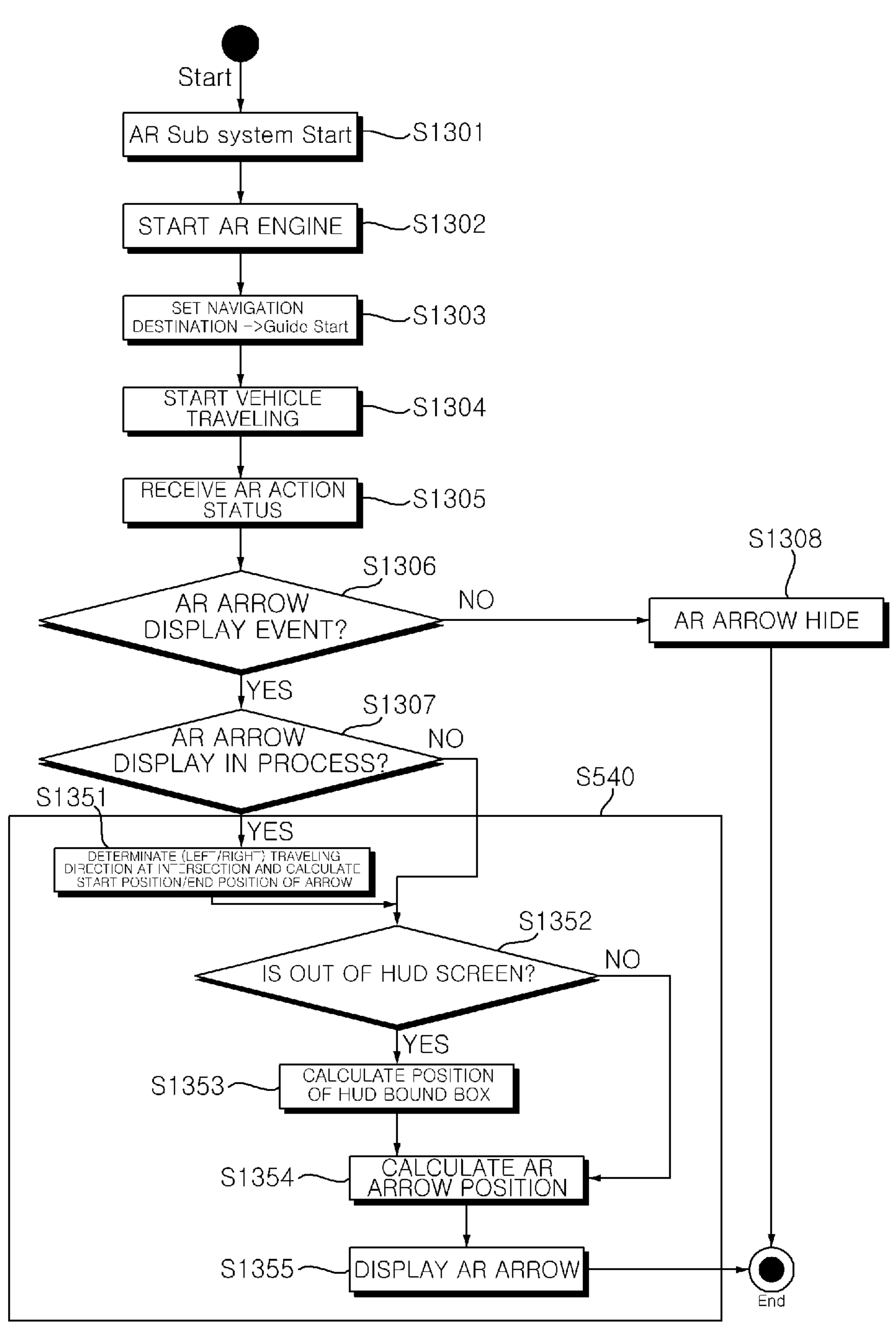

【FIG.13f】
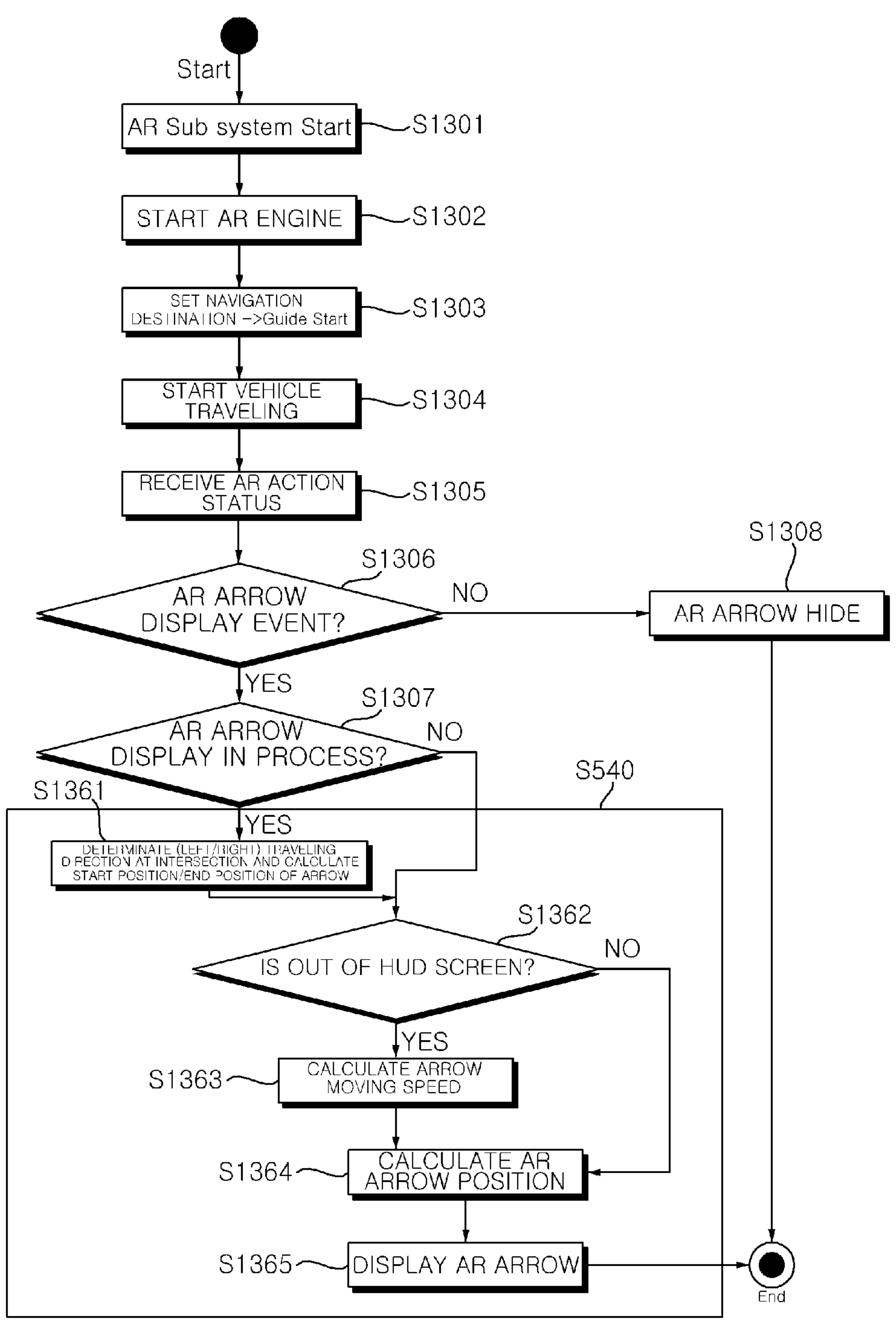

【FIG.13g】
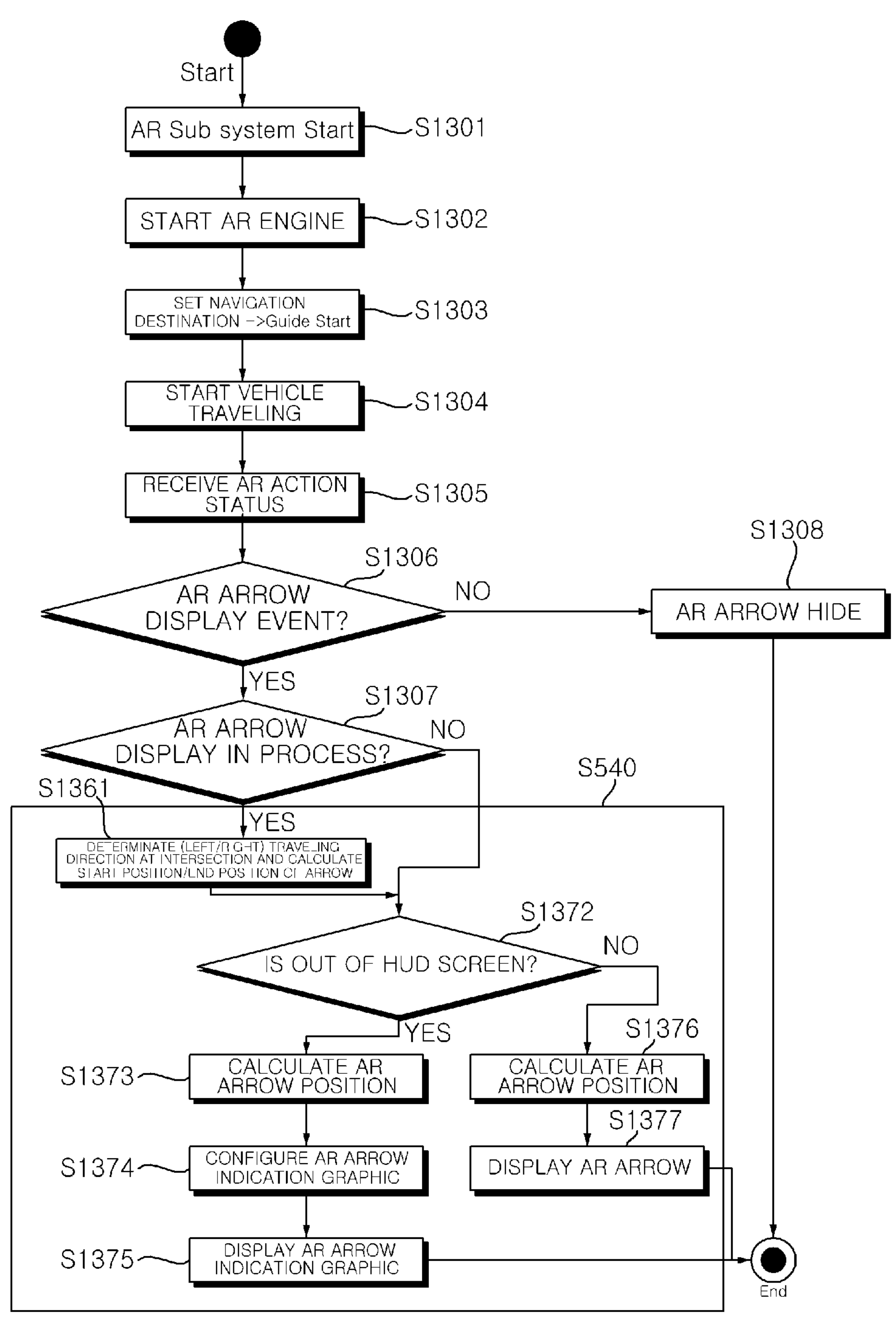

【FIG.14a】
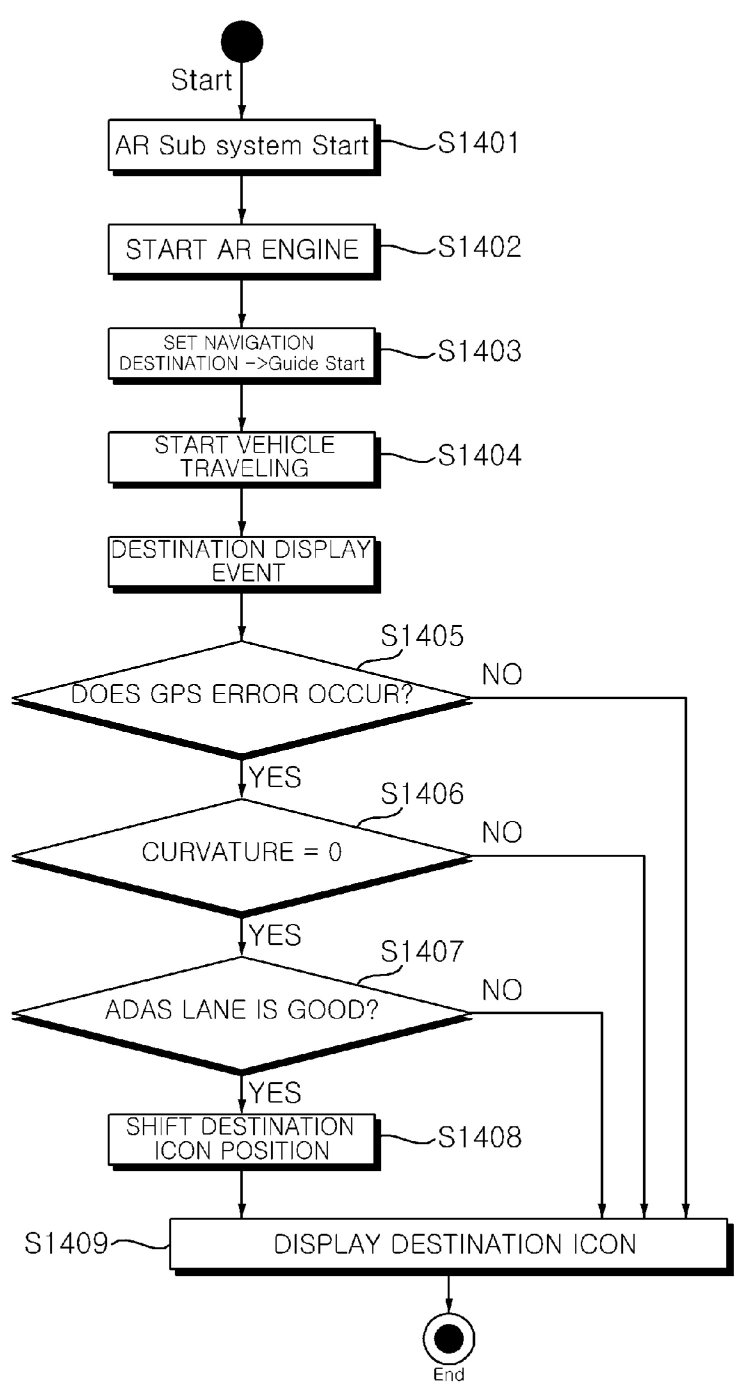

【FIG.14b】
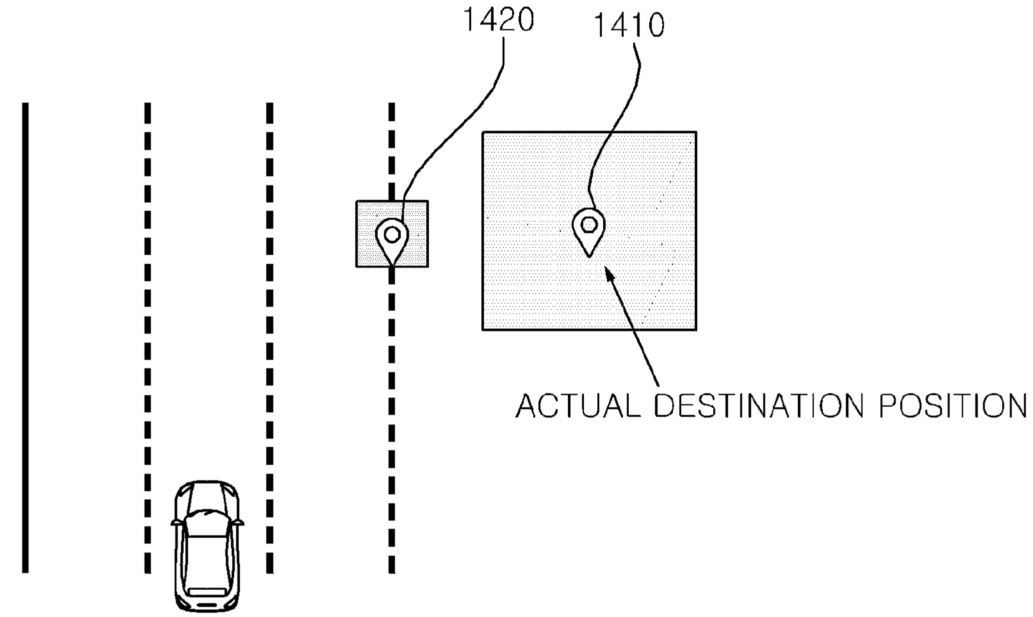

【FIG.14c】
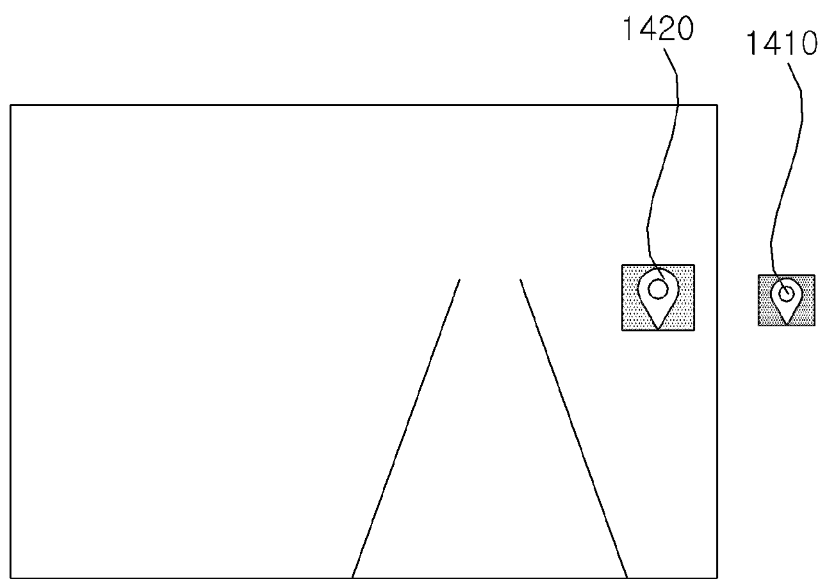

【FIG.15】
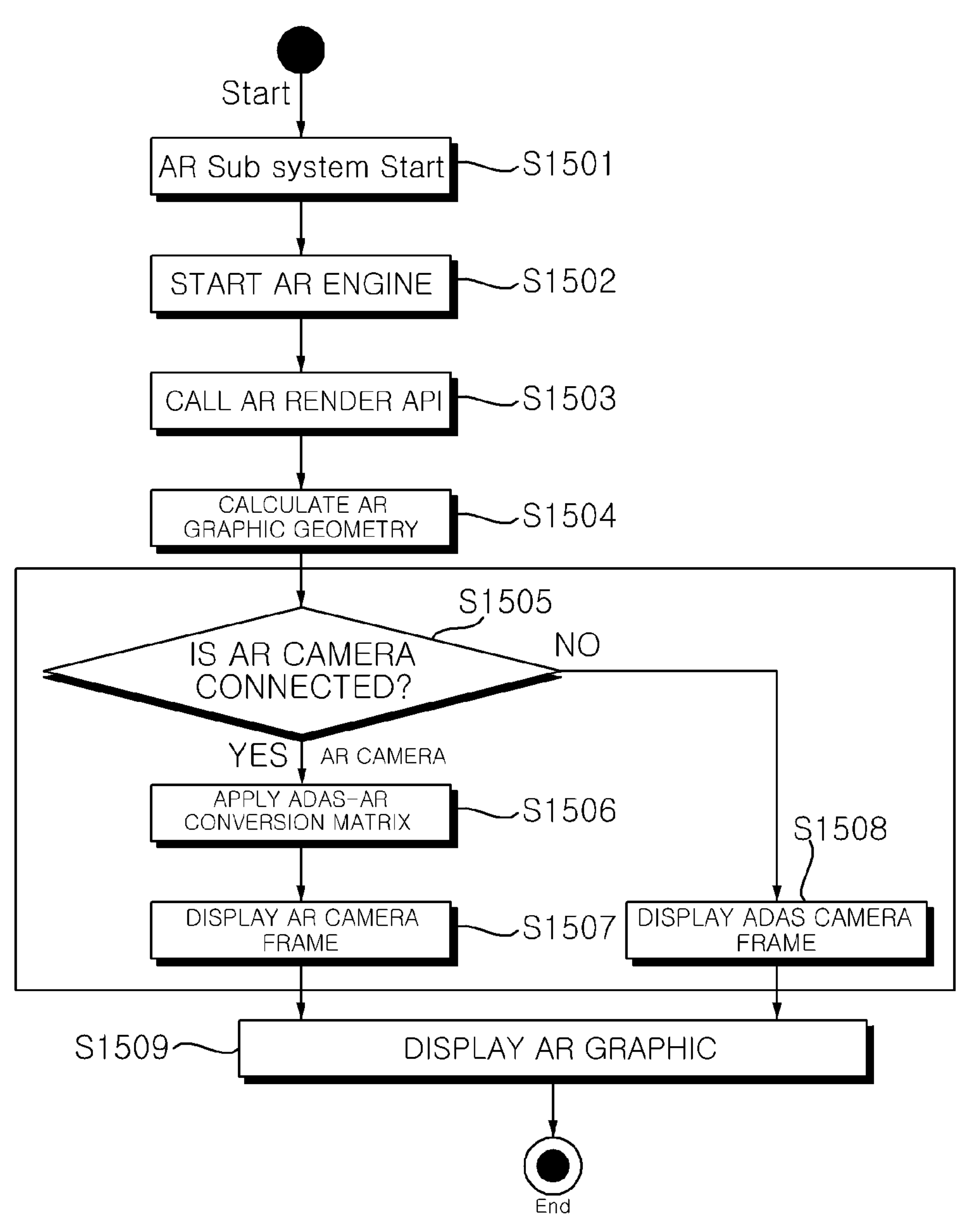

VEHICLE USER INTERFACE DEVICE AND OPERATING METHOD OF VEHICLE USER INTERFACE DEVICE

CROSS-REFERENCE TO RELATED APPLICATIONS

This application is a continuation of U.S. application Ser. No. 17/278,480, filed on Mar. 22, 2021, which is a National Stage application under 35 U.S.C. § 371 of International Application No. PCT/KR2018/011334, filed on Sep. 21, 2018, the contents of which are hereby incorporated by reference in their entirety.

BACKGROUND OF THE DISCLOSURE

Field of the Disclosure

The present disclosure relates to a vehicle user interface device and an operation method of a vehicle user interface device.

Related Art

A vehicle is a device that moves in a direction desired by a user on board. A typical example is an automobile.

Recently, a vehicle user interface device is implemented to display a graphic object in augmented reality (AR) as a display. In order to display an AR graphic object, accurate position data of an object corresponding to the AR graphic object is required.

When the position data of the object is incorrect, there is a problem that the AR graphic object displayed by the display points to an incorrect point or is shaken up, down, left and right.

SUMMARY

The present disclosure provides a vehicle user interface device that displays an AR graphic object with less heterogeneity even in a situation in which position data of an object is inaccurate.

The present disclosure also provides a method operation of a vehicle user interface device that displays the AR graphic object with little heterogeneity even in the situation in which the position data of the object is inaccurate.

Objects of the present disclosure are not limited to the objects mentioned above, and other objects that are not mentioned will be clearly understood by those skilled in the art from the following description.

In an aspect, there is provided a vehicle user interface device including: a display configured to display a first Augmented Reality (AR) graphic object at a point in a display area corresponding to a first point; and at least one processor configured to obtain distance data between a vehicle and the first point and change the first AR graphic object based on the distance data.

The processor may change at least one of a position, a moving distance, a moving speed, a size, and a display height of the first AR graphic object on the display area.

The processor may determine at least one of a degree of change of the first AR graphic object and a type of change of the first AR graphic object based on accuracy of the first point.

The processor may specify the first point based on GPS data and adjust the degree of change of the first AR graphic object based on a dilution of precision of the GPS data.

The processor may adjust the degree of change of the first AR graphic object based on at least one of data on a vanishing line, data on a curvature of a traveling road, and data on a vehicle movement.

When it is determined that there is no point in the display area corresponding to the first point, the processor may display the first AR graphic object at a point closest to the first point in the display area.

The processor may determine a moving direction and a moving speed of the first AR graphic object based on steering data of the vehicle.

The processor may specify the first point based on at least one data on object detected from image data.

Specific details of other embodiments are included in the detailed description and drawings.

Advantageous Effects

According to the present disclosure, there is one or more of the following effects.

First, by changing the AR graphic object, it is possible to solving heterogeneity that a user feels.

Second, more clear information can be delivered by the AR graphic object.

Effects of the present disclosure are not limited to the above-mentioned effects, and other effects not mentioned will be clearly understood by those skilled in the art from description of claims.

BRIEF DESCRIPTION OF THE DRAWINGS

FIG. 1 is a reference diagram illustrating a problem of an AR graphic object according to the prior art.

FIG. 2 is a reference diagram illustrating a vehicle user interface device according to one embodiment of the present disclosure.

FIG. 3 is a control block diagram of the vehicle user interface device according to one embodiment of the present disclosure.

FIG. 4 is a control block diagram of a vehicle according to one embodiment of the present disclosure.

FIG. 5 is a flowchart of the vehicle user interface device according to one embodiment of the present disclosure.

FIGS. 6A to 11B are reference diagrams illustrating operations of changing an AR graphic object according to one embodiment of the present disclosure.

FIGS. 12A to 12B are reference diagrams illustrating setting operations of the AR graphic object according to one embodiment of the present disclosure.

FIGS. 13A to 13G are flowcharts of the vehicle user interface device according to one embodiment of the present disclosure.

FIGS. 14A to 14C are reference diagrams illustrating operations of the vehicle user interface device according to one embodiment of the present disclosure.

FIG. 15 is a flowchart of the vehicle user interface device according to one embodiment of the present disclosure.

DESCRIPTION OF EXEMPLARY EMBODIMENTS

Hereinafter, exemplary embodiments disclosed in the present specification will be described in detail with reference to the accompanying drawings, identical or similar elements are denoted by the same reference numerals regardless of reference numerals, and repeated descriptions thereof will be omitted. Suffixes "module" and "unit" for constituent elements used in the following description are given or used interchangeably in consideration of only the ease of preparation of the specification, and do not themselves have distinct meanings or roles. In addition, in describing the embodiments disclosed in the present specification, when it is determined that detailed descriptions of related known technologies may obscure subject matters of the embodiments disclosed in the present specification, the detailed descriptions thereof will be omitted. In addition, the accompanying drawings are for easy understanding of the embodiments disclosed in the present specification, and the technical idea disclosed in the present specification is not limited by the accompanying drawings, and it should be understood to include all changes, equivalents, or substitutes falling within the spirit and scope of the present disclosure.

Terms including ordinal numbers such as first and second may be used to describe various components, but the components are not limited by the terms. The terms are used only for the purpose of distinguishing one component from another component.

When a component is referred to as being "coupled" or "connected" to another component, it may be directly connected or connected to the other component, but other components exist in the middle. On the other hand, when it is mentioned that a component is "directly coupled" or "directly connected" to another component, it should be understood that there is no other component in the middle.

Expressions in the singular include plural expressions unless the context clearly indicates otherwise.

In the present application, terms such as "include" or "have" are intended to designate the presence of features, numbers, steps, actions, components, parts, or a combination thereof described in the specification, and it is to be understood that the terms "include" or "have" do not preclude the presence or addition of one or more other features, numbers, steps, actions, components, parts, or combinations thereof.

Vehicles described herein may be a concept including automobiles and motorcycles. Hereinafter, as the vehicle, an automobile will be mainly described. The vehicle described in the present specification may be a concept including all of an internal combustion engine vehicle including an engine as a power source, a hybrid vehicle including an engine and an electric motor as a power source, and an electric vehicle including an electric motor as a power source.

In the following description, a left side means a left side in a straight traveling direction of the vehicle, and a right side means a right side in the straight traveling direction of the vehicle.

FIG. 1 is a reference diagram illustrating a problem of an Augmented Reality (AR) graphic object according to the prior art.

Referring to FIG. 1, a vehicle user interface device may display the AR graphic object corresponding to a specific point 101. Information on the specific point 101 is obtained based on at least one of Global Positioning System (GPS) data and image data. The GPS data and image data may not be accurate depending on various variables. In this case, an AR graphic object 103 is displayed corresponding to the specific point 101 calculated by data, not the point 102 at which the AR graphic object 103 should be displayed, and thus, there is a problem that the user may be confused. In addition, the GPS data and image data may have flexible accuracy depending on a position and a data acquisition time point of the vehicle. In this case, the AR graphic object 103 may be displayed shaking.

In order to solve this problem, a vehicle user interface device 200 of the present disclosure is provided.

FIG. 2 is a reference diagram illustrating a vehicle user interface device according to one embodiment of the present disclosure.

FIG. 3 is a control block diagram of the vehicle user interface device according to one embodiment of the present disclosure.

FIG. 4 is a control block diagram of a vehicle according to one embodiment of the present disclosure.

Referring 2 to 4, a vehicle 100 may include the user interface device 200, an object detection device 110, a communication device 120, a driving operation device 130, the main ECU 140, a vehicle driving device 150, a traveling system 160, a sensing unit 170, and a position data generating device 180. Depending on an embodiment, the vehicle 100 may further include other components. Depending on an embodiment, the vehicle 100 may not include some of the components of FIG. 4.

The user interface device 200 is a device for communicating with the vehicle 100 and a user. The user interface device 200 may receive a user input and provide information generated in the vehicle 100 to the user. The vehicle 100 may implement User Interfaces (UI) or User Experience (UX) through the user interface device 200.

The user interface device 200 may include an input unit 210, an internal camera 220, an AR camera 225, a biometric detector 230, an output unit 250, and a processor 270. Depending on an embodiment, the user interface device 200 may further include other components in addition to the described components, or may not include some of the described components.

The input unit 210 is for receiving information from the user, and data generated by the input unit 210 may be processed as a control signal by the processor 270. The input unit 210 may be disposed inside the vehicle. For example, the input unit 210 may disposed in one region of a steering wheel, one region of an instrument panel, one region of a seat, one region of each pillar, one region of a door, one area of a center console, one area of head lining, one area of a sun visor, one area of a windshield, one region of a window, or the like. The input unit 210 may include a voice input unit 211, a gesture input unit 212, a touch input unit 213, and a mechanical input unit 214.

The voice input unit 211 may convert a voice input of the user into an electrical signal. The converted electrical signal may be provided to the processor 270 or a controller 270. The voice input unit 211 may include at least one microphone.

The gesture input unit 212 may convert a gesture input of the user into an electrical signal. The converted electrical signal may be provided to the processor 270 or the controller 270. The gesture input unit 212 may include at least one of an infrared sensor and an image sensor for detecting the gesture input of the user. Depending on an embodiment, the gesture input unit 212 may detect a 3D gesture input of the user. To this end, the gesture input unit 212 may include a plurality of optical output units that output infrared light or a plurality of image sensors. The gesture input unit 212 may detect the 3D gesture input of the user through a time of flight (TOF) method, a structured light method, or a disparity method.

The touch input unit 213 may convert a touch input of the user into an electrical signal. The converted electrical signal may be provided to the processor 270 or the controller 270. The touch input unit 213 may include a touch sensor for sensing the touch input of the user. Depending on an embodiment, the touch input unit 213 is integrally formed with the display 251, thereby implementing a touch screen.

The touch screen may provide an input interface and an output interface between the vehicle 100 and the user together.

The mechanical input unit 214 may include at least one of a button, a dome switch, a jog wheel, and a jog switch. An electrical signal generated by the mechanical input unit 214 may be provided to the processor 270 or the controller 270. The mechanical input unit 214 may be disposed in a steering wheel, a center fascia, a center console, a cock pick module, a door, or the like.

The internal camera 220 may acquire an image inside the vehicle. The processor 270 may detect a state of the user based on the image inside the vehicle. The processor 270 may obtain gaze information of the user from the image inside the vehicle. The processor 270 may detect a gesture of the user from the image inside the vehicle.

The AR camera 225 may capture an image in front of the vehicle. The AR camera 225 may be disposed indoors to face the front of the vehicle. It is preferable that the AR camera 225 is disposed close to the windshield. An image captured by the AR camera 225 may be provided to the processor 270. Depending on an embodiment, the AR camera 225 may be classified as an external configuration of the user interface device 200. In this case, the interface unit 245 may receive image data in front of the vehicle from the AR camera 225 and transmit the received image data to the processor 270.

The biometric detector 230 may obtain biometric information of the user. The biometric detector 230 includes a sensor capable of acquiring the biometric information of the user, and may acquire fingerprint information of the user, heart rate information, or the like using the sensor. The biometric information can be used for user authentication.

The output unit 250 is for generating an output related to visual, auditory or tactile sense. The output unit 250 may include at least one of a display 251, a sound output unit 252, and a haptic output unit 253.

The display 251 may display graphic objects corresponding to various types of information.

The display 251 may include at least one of a liquid crystal display (LCD), a thin film transistor-liquid crystal display (TFT LCD), an organic light-emitting diode (OLED), a flexible display, a 3D display, and an e-ink display.

The display 251 may form a layer structure or integrally with the touch input unit 213, thereby implementing a touch screen.

The display 251 may be implemented as a Head Up Display (HUD). When the display 251 is implemented as a HUD, the display 251 may include a projection module to output information through a windshield or an image projected on a window.

The display 251 may include a transparent display. The transparent display may be attached to a windshield or window. The transparent display may display a predetermined screen while having a predetermined transparency. In order to have transparency, the transparent display may include at least one of a transparent Thin Film Elecroluminescent (TFEL), a transparent Organic Light-Emitting Diode (OLED), a transparent Liquid Crystal Display (LCD), a transmissive transparent display, and a transparent Light Emitting Diode (LED) display. The transparency of the transparent display may be adjusted.

As illustrated in FIG. 2, the display 251 may be implemented with at least one of a cluster 251*a*, a center integrated display (CID) 251*b*, and a head up display (HUD). Depending on an embodiment, the display 251 may be disposed in one region of the steering wheel, one region of the instrument panel, one region of the seat, one region of each pillar, one region of the door, one area of the center console, one area of the head lining, one area of the sun visor, or may be implemented in one area of the windshield or one region of a window.

The display 251 may display a first Augmented Reality (AR) graphic object at a point in the display area corresponding to the first point. The first point may be understood as a geographic position. The first AR graphic object may be displayed in three dimensions to match the first point in an image together with the image, and may be a visual pattern or text containing information related to the first point.

The sound output unit 252 converts an electrical signal provided from the processor 270 or the controller 270 into an audio signal and outputs the converted audio signal. To this end, the sound output unit 252 may include at least one speaker.

The haptic output unit 253 generates a tactile output. For example, the haptic output unit 253 may vibrate a steering wheel, a seat belt, and a seat to operate so that a user can recognize the output.

The processor 270 may be electrically coupled to the input unit 210, the internal camera 220, the AR camera 225, the biometric detector 230, a memory 240, the interface unit 245, an output device 250, and a power supplier 290 to exchange a signal. The processor 270 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performs other functions. The processor 270 may be driven by power provided from the power supplier 290.

The processor 270 may exchange a signal with at least one of the input unit 210, the internal camera 220, the AR camera 225, the biometric detector 230, the memory 240, the interface unit 245, the output device 250, and the power supplier 290.

The processor 270 may receive image data in front of the vehicle from the AR camera 225. When the AR camera 225 is classified as a sub-element of the user interface device 200, the processor 270 may directly receive the image data in front of the vehicle from the AR camera 225. When the AR camera 225 is not classified as a sub-element of the user interface device 200, the processor 270 may receive the image data in front of the vehicle from the AR camera through the interface unit 245. The processor 270 may display the AR graphic object on the display 251 together with the image data in front of the vehicle received from the AR camera.

The processor 270 may receive image data in front of the vehicle acquired by the camera of the object detection device 110. The processor 270 may receive the image data in front of the vehicle from the object detection device 110 through the interface unit 245. The processor 270 may display the AR graphic object on the display 251 together with the image data in front of the vehicle received from the object detection device 110.

The processor 270 may specify the first point. For example, the processor 270 may specify the first point based on the GPS data received from the position data generating apparatus 180. For example, the processor 270 may specify the first point based on the image in front of the vehicle acquired by the camera in the object detection device 110. The processor 270 may provide a control signal to the display to display the first AR graphic object at a point in the display area corresponding to the first point.

The processor 270 may obtain distance data between the vehicle 100 and the first point. For example, the processor 270 may obtain the distance data between the vehicle 100 and the first point based on the GPS data. For example, the processor 270 may obtain the distance data between the vehicle 100 and the first point based on the image in front of the vehicle.

The processor 270 may change the first AR graphic object based on the distance data. The processor 270 may change at least one of a position, a moving distance, a moving speed, a size, and a display height of the first AR graphic object on the display area.

The processor 270 may determine at least one of a degree of change of the first AR graphic object and a type of change of the first AR graphic object based on accuracy of the first point. Meanwhile, the accuracy of the first point may be determined by at least one of dilution of precision (DOP) data of GPS, communication data with an external device through the communication device 120, image data of the object detection device 110, and map data stored in the memory 240.

The processor 270 may specify a first point based on the GPS data. The processor 270 may receive the dilution of precision (DOP) data of GPS along with GPS data. The processor 270 may adjust the degree of change of the first AR graphic object based on the dilution of precision data of GPS. For example, the processor 270 may increase the degree of change of the first AR graphic object in proportion to the dilution of precision of the GPS data. The processor 270 may select the type of change of the first AR graphic object based on the dilution of precision of the GPS data. For example, the processor 270 may change the display height of the first AR graphic object when the dilution of precision of the GPS data is more than or equal to a reference value.

The processor 270 may obtain data on a vanishing line and data on a curvature of a traveling road based on the image in front of the vehicle acquired by the camera of the object detection device 110. The processor 270 may obtain data on the curvature of the traveling road based on the map data. The processor 270 may acquire motion data of the vehicle 100 based on sensing data generated by the sensing unit 170.

The processor 270 may adjust the degree of change of the first AR graphic object based on at least one of data on the vanishing line, data on the curvature of the traveling road, and motion data of the vehicle 100. For example, when the vanishing line is located above a center line in a right-left direction of the screen, the processor 270 may increase the degree of change of the first AR graphic object more than when it is located below. For example, when the curvature of the traveling road is large, the processor 270 may increase the degree of change of the first AR graphic object more than when the curvature of the road is small. For example, when the movement of the vehicle 100 is large, the processor 270 may increase the degree of change of the first AR graphic object more than when the movement of the vehicle 100 is small.

When it is determined that there is no point corresponding to the first point in the display area, the processor 270 may display the first AR graphic object at a point closest to the first point in the display area.

The processor 270 may determine the moving direction and the moving speed of the first AR graphic object based on the steering data of the vehicle 100.

The processor 270 may specify a first point based on data on at least one object detected from the image data. Here, the object may be a fixed object that can be used as a landmark.

The memory 240 is electrically connected to the processor 270. The memory 240 may store basic data for a unit, control data for controlling the operation of the unit, and input/output data. The memory 240 may store data processed by the processor 270. In terms of hardware, the memory 240 may be configured with at least one of ROM, RAM, EPROM, a flash drive, and a hard drive. The memory 240 may store various data for an overall operation of the user interface device 200, such as a program for processing or controlling the processor 270. The memory 240 may be implemented integrally with the processor 270.

The memory 240 may store map data. Map data stored in the memory 240 may be updated through the communication device 120.

The interface unit 245 may exchange signals with other devices included in the vehicle 100 in a wired manner or a wireless manner. The interface unit 245 may exchange a signal with at least one of the communication device 220, the driving operation device 230, the main ECU 240, the vehicle driving device 250, the traveling system 260, the sensing unit 270, and the position data generating device 280 in a wired manner or a wireless manner. The interface unit 245 may be constituted by at least one of a communication module, a terminal, a pin, a cable, a port, a circuit, an element, and a device.

The power supplier 290 may supply power to the user interface device 200. The power supplier 290 may receive power from a power source (for example, a battery) included in the vehicle 100 and supply the power to the user interface device 200. The power supplier 290 may be operated according to a control signal provided from the main ECU 240. The power supplier 290 may be implemented as a switched-mode power supply (SMPS).

The user interface device 200 may include at least one printed circuit board (PCB). The input unit 210, internal camera 220, AR camera 225, biometric detector 230, memory 240, interface unit 245, output device 250, processor 270 and power supplier 290 may be electrically coupled to the printed circuit board.

Meanwhile, the vehicle user interface device 200 includes the display 251 that displays the first AR graphic object at a point of the display area corresponding to the first point, at least one processor 270, and a computer-readable medium that executes a plurality of steps when driven by the processor, in which the plurality of steps includes displaying the first AR graphic object at a point in the display area corresponding to the first point, receiving the distance data between the vehicle and the first point, and changing the first AR graphic object based on the distance data.

The object detection device 110 may detect an object outside the vehicle 100. The object detection device 110 may include at least one of a camera, a radar, a lidar, an ultrasonic sensor, and an infrared sensor. The object detection device 110 may provide data on an object generated based on a sensing signal generated by a sensor to at least one electronic device included in the vehicle.

The communication device 120 may exchange a signal with a device located outside the vehicle 100. The communication device 120 may exchange a signal with at least one of an infrastructure (for example, a server) and another vehicle. The communication device 120 may include at least one of a transmission antenna, a reception antenna, a radio frequency (RF) circuit capable of implementing various communication protocols, and an RF element to perform communication.

The driving operation device 130 is a device that receives a user input for driving. In the case of a manual mode, the vehicle 100 may be driven based on a signal provided by the driving operation device 130. The driving operation device 130 may include a steering input device (for example, a steering wheel), an acceleration input device (for example, an accelerator pedal), and a brake input device (for example, a brake pedal).

The main Electronic Control Unit (ECU) 140 may control the overall operation of at least one electronic device provided in the vehicle 100.

The vehicle driving device 150 is a device that electrically controls driving of various devices in the vehicle 100. The vehicle driving device 150 may include a power train driver, a chassis driver, a door/window driver, a safety device driver, a lamp driver, and an air conditioning driver. The power train driver may include a power source driver and a transmission driver. The chassis driver may include a steering driver, a brake driver, and a suspension driver.

The traveling system 160 may perform a driving operation of the vehicle 100. The traveling system 160 may move the vehicle 100 by providing a control signal to at least one of the power train driver and the chassis driver of the vehicle driving device 150.

The traveling system 160 may include at least one of an advanced driver assistance system (ADAS) application and an autonomous driving application. The traveling system 160 may generate a traveling control signal by at least one of the ADAS application and the autonomous driving application.

The sensing unit 170 may sense a state of the vehicle. The sensing unit 170 may include at least one of an inertial navigation unit (IMU) sensor, a collision sensor, a wheel sensor, a speed sensor, a tilt sensor, a weight detection sensor, a heading sensor, a position module sensor, a vehicle forward/reverse movement sensor, a battery sensor, a fuel sensor, a tire sensor, a steering sensor by steering wheel rotation, a vehicle interior temperature sensor, a vehicle interior humidity sensor, an ultrasonic sensor, an illuminance sensor, an accelerator pedal position sensor, and a brake pedal position sensor. Meanwhile, the inertial navigation unit (IMU) sensor may include one or more of an acceleration sensor, a gyro sensor, and a magnetic sensor.

The sensing unit 170 may generate state data of the vehicle based on a signal generated by at least one sensor. The sensing unit 170 may acquire sensing signals related to vehicle attitude information, vehicle motion information, vehicle yaw information, vehicle roll information, vehicle pitch information, vehicle collision information, vehicle direction information, vehicle angle information, vehicle speed information, vehicle acceleration information, vehicle tilt information, vehicle forward/reverse movement information, battery information, fuel information, tire information, vehicle ramp information, vehicle internal temperature information, vehicle internal humidity information, steering wheel rotation angle, vehicle exterior illuminance, a pressure applied to an accelerator pedal, a pressure applied to a brake pedal, or the like.

Moreover, the sensing unit 170 may further include an accelerator pedal sensor, a pressure sensor, an engine speed sensor, an air flow sensor (AFS), an intake air temperature sensor (ATS), a water temperature sensor (WTS), a throttle position sensor (TPS), a TDC sensor, a crank angle sensor (CAS), or the like.

The sensing unit 170 may generate vehicle state information based on the sensing data. The vehicle state information may be information generated based on data sensed by various sensors provided inside the vehicle.

For example, the vehicle status information may include vehicle attitude information, vehicle speed information, vehicle tilt information, vehicle weight information, vehicle direction information, vehicle battery information, vehicle fuel information, vehicle tire air pressure information, vehicle steering information, vehicle interior temperature information, vehicle interior humidity information, pedal position information, vehicle engine temperature information, or the like.

The position data generating device 180 may generate position data of the vehicle 100. The position data generating apparatus 180 may include at least one of a Global Positioning System (GPS) and a Differential Global Positioning System (DGPS). The position data generating apparatus 180 may generate position data of the vehicle 100 based on a signal generated by at least one of the GPS and DGPS. Depending on an embodiment, the position data generating apparatus 180 may correct the position data based on at least one of an Inertial Measurement Unit (IMU) of the sensing unit 170 and a camera of the object detection device 110.

The vehicle 100 may include an internal communication system 50. A plurality of electronic devices included in the vehicle 100 may exchange signals through the internal communication system 50. Signals may include data. The internal communication system 50 may use at least one communication protocol (for example, CAN, LIN, FlexRay, MOST, Ethernet).

FIG. 5 is a flowchart of the vehicle user interface device according to one embodiment of the present disclosure.

Referring to FIG. 5, an operation method of the vehicle user interface device will be described. Referring to FIG. 5, the processor 270 may specify the first point (S510). The processor 270 may specify the first point based on the GPS data. The processor 270 may specify the first point based on data on at least one object detected from image data acquired by the camera of the object detection device 210.

The processor 270 may display the first AR graphic object at a point in the display area of the display 251 corresponding to the first point (S520). For example, the processor 270 may display an image captured by the AR camera 225 on the display 251. The processor 270 may display the first AR graphic object at a point corresponding to the first point in the image.

The processor 270 may obtain distance data between the vehicle 100 and the first point (S530). For example, the processor 270 may obtain the distance data between the vehicle 100 and the first point based on the GPS data. For example, the processor 270 may obtain the distance data between the vehicle 100 and the first point based on the image in front of the vehicle.

The processor 270 may change the first AR graphic object based on the distance data (S540).

The changing (S540) may include changing, by the processor 270, at least one of the moving distance, the moving speed, the size, and the display height of the first AR graphic object.

The changing (S540) may include determining, by the processor 270, at least one of the degree of change of the first AR graphic object and the type of change of the first AR graphic object based on the accuracy of the first point.

The changing (S540) may include determining, by the processor 270, at least one of the degree of change of the first AR graphic object and the type of change of the first AR graphic object based on the accuracy of the first point.

The changing (S540) may include adjusting, by the processor 270, the degree of change of the first AR graphic object based on the dilution of precision of the GPS data.

The changing (S540) may include adjusting, by the processor 270, the degree of change of the AR graphic object based on at least one of the data on the vanishing line, the data on the curvature of the traveling road, and the motion data of the vehicle.

The changing (S540) may include displaying, by the processor 270, the first AR graphic object at a point closest to the first point in the display area, when it is determined that there is no point corresponding to the first point in the display area.

The changing (S540) may include determining, by the processor 270, the moving direction and the moving speed of the first AR graphic object based on the steering data of the vehicle.

FIGS. 6A to 11B are reference diagrams illustrating the operations of changing the AR graphic object according to one embodiment of the present disclosure.

As illustrated in FIGS. 6A and 6B, the processor 270 may display AR graphic objects 610 and 620 at a point in the display area corresponding to the specified first point together with the image in front of the vehicle. The image in front of the vehicle may be acquired by at least one of the AR camera 225 and the object detection device 110. The processor 270 may display arrow images 610 and 620 on a point of an intersection in the image in front of the vehicle. The directions of the arrow images 610 and 620 may indicate a rotation direction of the vehicle 100 on a path at the intersection.

The processor 270 may change the first AR graphic objects 610 and 620 based on distance data between the vehicle 100 and the first point. The processor 270 may gradually increase the arrow images 610 and 620 as the vehicle 100 approaches the intersection. The processor 270 may gradually move the arrow images 610 and 620 in the direction in which the arrow is directed as the vehicle 100 approaches the intersection. For example, when a right turn path is set at an intersection, the processor 270 may continuously move the arrow from the left to the right of the display screen while displaying the arrow image 610 gradually larger as the vehicle 100 approaches the intersection. For example, when a left turn path is set at an intersection, the processor 270 may continuously move the arrow from the right to the left of the display screen while displaying the arrow image 620 gradually larger as the vehicle 100 approaches the intersection.

In this way, by changing the sizes and positions of the arrow images 610 and 620, it is possible to prevent a user from recognizing an erroneous display or shaking of the AR graphic image.

As illustrated in FIGS. 7A to 7B, the processor 270 may adjust the degree of change of first AR graphic objects 710 and 720 based on at least one of the accuracy for the first point, the data on the vanishing line, the data on the curvature of the traveling road, and the motion data of the vehicle.

The processor 270 may determine the accuracy of the first point based on the DOP data information of the GPS data. The processor 270 may determine the accuracy of the first point based on the vehicle 100 received from another vehicle and the position data of the first point through the communication device 120. The processor 270 may determine the accuracy of the first point based on the sensing data for the first point acquired by the object detection device 110.

Compared with when the accuracy for the first point is high (as in FIG. 7A, the accuracy is a first reference value or more), when the accuracy for the first point is low (as illustrated in FIG. 7B, the accuracy is less than a second reference value), the processor 270 may move the first graphic object so that the movement distance is larger. Compared with when the accuracy for the first point is high (as in FIG. 7A, the accuracy is a first reference value or more), when the accuracy for the first point is low (as illustrated in FIG. 7B, the accuracy is less than a second reference value), the processor 270 may move the first graphic object so that the moving speed is faster.

Compared with when the vanishing line is located below a center line of a screen in a horizontal direction, when the vanishing line is located above the center line, the processor 270 may move the first graphic object so that the moving distance increases. Compared with when the vanishing line is located below the center line of the screen in the horizontal direction, when the vanishing line is located above the center line, the processor 270 may move the first graphic object so that the moving speed is faster.

Compared with when the curvature of the traveling road is large, when the curvature of the traveling road is small, the processor 270 may move the first graphic object so that the moving distance increases. Compared with when the curvature of the traveling road is large, when the curvature of the traveling road is small, the processor 270 may move the first graphic object so that the moving distance increases.

Compared with when the movement of the vehicle 100 is small, when the movement of the vehicle 100 is large, the processor 270 may move the first graphic object so that the movement distance increases. Compared with when the movement of the vehicle 100 is small, when the movement of the vehicle 100 is large, the processor 270 may move the first graphic object so that the moving speed is faster.

As illustrated in FIGS. 8A to 8B, the processor 270 may adjust a height of the first AR graphic objects 710 and 720 on the screen based on at least one of the accuracy for the first point, the data on the vanishing line, the data on the curvature of the traveling road, and the motion data of the vehicle.

Compared with when the accuracy for the first point is high (as in FIG. 8A, the accuracy is the first reference value or more), when the accuracy for the first point is low (as illustrated in FIG. 8B, the accuracy is less than the second reference value), the processor 270 may display a first graphic object 820 at a higher point on the display screen.

Compared with when the vanishing line is lower than the center line of the screen in the horizontal direction, when the vanishing line is higher than the center line of the screen, the processor 270 may display the first graphic object at a higher point on the display screen.

Compared with when the curvature of the traveling road is large, when the curvature of the traveling road is small, the processor 270 may display the first graphic object at a higher point on the screen.

Compared with when the movement of the vehicle 100 is small, when the movement of the vehicle 100 is large, the processor 270 may display the first graphic object at a higher point on the screen than.

As illustrated in FIGS. 9A and 9B, when it is determined that there is no point corresponding to the first point in the display area, the processor 270 may display the first graphic object at a point closest to the first point in the display area.

The processor 270 may display only a partial area of the acquired image data in front of the vehicle on the display 251. In this case, the first point corresponding to the first graphic object may not be visible in the display area of the display 251.

When arrow images 910 and 920 are to be displayed outside the display 251, the processor 270 may display the arrow images 910*a* and 920*a* on the outer portion of the display 251. When connecting a center 901 of the display 251 from a point on the screen where the arrow images 910 and 920 should be displayed corresponding to the first point, the processor 270 may display the arrow images 910*a* and 920*a* on the outer portion of the display 251.

As illustrated in FIG. 10, the processor 270 may determine the moving direction and the moving speed of the first AR graphic object based on the steering data of the vehicle 100.

The processor 270 may set a starting point 1001 and an ending point 1002 of the movement when the arrow image is moved in the right-left direction. As described with reference to FIGS. 9A and 9B, when the starting point 1001 of the arrow image is located outside the screen, the processor 270 may display the arrow image 1010*a* on the outer portion of the display 251.

When the vehicle 100 moves in the right-left direction, the display 251 also moves in the right-left direction. In this case, arrow images 1010*a*, 1010*b*, 1010*c*, and 1010*d* and the display 251 move together. While the vehicle 100 moves to a right side according to a right steering input, the arrow images 1010*a*, 1010*b*, 1010*c*, and 1010*d* may be controlled to move to the right side. In this case, the movement of the display 251 may be faster than the movements of the arrow images 1010*a*, 1010*b*, 1010*c*, and 1010*d*. In this case, the processor 270 may move the arrow image to a left side of the display area based on the display area of the display 251.

Meanwhile, the processor 270 may decrease a moving speed of the arrow when the vehicle 100 does not move left and right, and increase the moving speed of the arrow when the vehicle 100 moves left and right.

As illustrated in FIGS. 11A and 11B, when an arrow image 1110 is out of the screen display area of the display 251, the processor 270 may display images 1120 and 1130 indicating a point at which the arrow image 1110 should be displayed. The processor 270 may display connection lines 1120 and 1130 when connecting the point where the arrow image 1110 should be displayed and the center point 251 of the display 251 in the display area. In this case, as illustrated in FIG. 11B, the processor 270 may further display an arrow shape indicating a display point of the arrow image 1110.

FIGS. 12A and 12B are reference diagrams illustrating the setting operations of the AR graphic object according to one embodiment of the present disclosure.

Referring to FIGS. 12A and 12B, the processor 270 may receive a touch input of the user through the display 251. The processor 270 may set a display method of an arrow based on the touch input of the user. The processor 270 may set at least one of a display direction, a moving distance, and a display height of an arrow based on the touch input of the user.

FIGS. 13A to 13G are flowcharts of the vehicle user interface device according to one embodiment of the present disclosure.

Referring FIGS. 13A to 13G, the processor 270 may start an AR system (S1301). The processor 270 may start an AR engine (S1302). The AR engine may perform a role of acquiring the image in front of the vehicle and generating the AR graphic object to match the AR graphic object to a specified first point in the image in front of the vehicle. The processor 270 may set a navigation destination and start a route guide (S1303). The traveling of the vehicle may be started (S1304). The processor 270 may receive an AR operation state (S1305). The processor 270 may determine whether an AR arrow display event occurs (S1306). For example, the processor 270 may determine whether the AR arrow image should be displayed as a left or right turn path occurs at an intersection. The processor 270 may display the AR arrow at a point in the display area corresponding to the first point (S1307). Meanwhile, in Step S1306, when the AR arrow display event does not occur, the processor 270 does not display the AR arrow on the display 251.

Thereafter, the processor 270 may obtain the distance data between the vehicle 100 and the first point (S530 in FIG. 5), and change the first AR graphic object based on the distance data (S540). Hereinafter, an embodiment of an operation of changing the first AR graphic object will be described with reference to FIGS. 13A to 13G.

Referring to FIG. 13A, the processor 270 may determine a traveling direction (for example, a right turn or a left turn) at the intersection and calculate a start point and an end point of an arrow (S1311). The processor 270 may calculate the position of the AR arrow image (S1312). The processor 270 may move and display the AR arrow image (S1313).

Referring to FIG. 13B, the processor 270 may determine the traveling direction (for example, a right turn or a left turn) at the intersection, and calculate the start point and the end point of the arrow (S1321). The processor 270 may determine that a position error of the GPS is less than a threshold (S1322). The processor 270 may determine whether the vanishing line change width is less than a threshold or whether linearity (determined by curvature) of a road is less than a threshold (S1323). The processor 270 may determine whether the amount of change of the sensor with respect to the movement of the vehicle is less than a threshold (S1324). When it is determined that the values are equal to or less than the threshold in all Steps S1322, S1323, and S1324, the processor 270 may calculate the position so that the AR arrow image is slightly moved (S1325). When it is determined that the value is equal to or more than the threshold in at least one of Steps S1322, S1323, and S1324, the processor 270 may calculate the position so that the AR arrow image is largely moved (S1326). The processor 270 may move and display the AR arrow image (S1327).

Referring to FIG. 13C, the processor 270 may determine the traveling direction (for example, the right turn or the left turn) at the intersection, and calculate the start point and the end point of the arrow (S1331). The processor 270 may determine whether there is a user setting for the direction and moving distance of the arrow image (S1332). If there is the user setting, the processor 270 may update the direction and moving distance information of the arrow image (S1333). The processor 270 may calculate the AR arrow position (S1334). The processor 270 may move and display the AR arrow image (S1335).

Referring to FIG. 13D, the processor 270 may determine the traveling direction (for example, the right turn or the left turn) at the intersection and calculate the start point and the end point of the arrow (S1341). The processor 270 may determine whether there is a user setting for a display height of the arrow image (S1342). If there is the user setting, the processor 270 may update display height information of the arrow image (S1343). The processor 270 may calculate the AR arrow position (S1344). The processor 270 may move and display the AR arrow image (S1345).

Referring to FIG. 13E, the processor 270 may determine the traveling direction (for example, the right turn or the left turn) at the intersection, and calculate the start point and the end point of the arrow (S1351). The processor 270 may determine whether at least one of the start point and the end point of the arrow is out of the display screen of the display 251 (S1352). The processor 270 may calculate a position of a bound box of the display (S1353). The processor 270 may calculate a point where a line connecting at least one of the start point and the end point of the arrow to the center of the display 251 meets the outer portion of the display 251. The processor 270 may calculate the AR arrow position (S1354). The processor 270 may move and display the AR arrow image (S1355).

Referring to FIG. 13F, the processor 270 may determine the traveling direction (for example, the right turn or the left turn) at the intersection, and calculate the start point and the end point of the arrow (S1361). The processor 270 may determine whether at least one of the start point and the end point of the arrow is out of the display screen of the display 251 (S1362). The processor 270 may calculate the moving speed of the AR arrow based on the steering data (S1363). The processor 270 may calculate the AR arrow position (S1364). The processor 270 may move and display the AR arrow image (S1365).

Referring to FIG. 13G, the processor 270 may determine the traveling direction (for example, the right turn or the left turn) at the intersection, and calculate the start point and the end point of the arrow (S1371). The processor 270 may determine whether at least one of the start point and the end point of the arrow is out of the display screen of the display 251 (S1372). When it is determined that at least one of the start point and the end point is out of the display screen, the processor 270 may calculate the AR arrow position (S1373). The processor 270 may configure a graphic indicating the AR arrow (S1374). The configured graphic may be displayed as the connection line (1120 and 1130 in FIGS. 11A and 11B). The processor 270 may display an AR arrow indication graphic (S1375). When it is determined in S1372 that at least one of the start point and the end point is not out of the display screen, the processor 270 may calculate the AR arrow position (S1376). The processor 270 may move and display the AR arrow image (S1377).

FIGS. 14A to 14C are reference diagrams illustrating the operations of the vehicle user interface device according to one embodiment of the present disclosure.

The processor 270 may start the AR system (S1401). The processor 270 may start the AR engine (S1402). The AR engine may perform a role of acquiring the image in front of the vehicle and generating the AR graphic object to match the AR graphic object to the specified first point in the image in front of the vehicle. The processor 270 may set the navigation destination and start the route guide (S1403). The traveling of the vehicle may be started (S1404). The processor 270 may acquire destination indication event information (S1404-1). The processor 270 may determine whether the GPS data error occurs (S1405). The processor 270 may determine whether the traveling road is a straight road (S1406). The processor 270 may determine whether a lane is recognized by the object detection device 120 (S1407). When the conditions of Steps S1405, S1406, and S1407 are satisfied, the processor 270 may move and display (1420) a destination icon 1410 (S1408). When any one of the conditions of Steps S1405, S1406, and S1407 is not satisfied, the processor 270 may display the destination icon 1410 so that the destination icon 1410 corresponds to the destination (S1409).

FIG. 15 is a flowchart of the vehicle user interface device according to one embodiment of the present disclosure.

Referring to FIG. 15, the processor 270 may start the AR system (S1501). The processor 270 may start the AR engine (S1502). The processor 270 may call an AR render application programming interface (API) (S1503). The processor 270 may calculate the AR graphic geometry (S1504). The processor 270 may determine whether the AR camera is electrically connected (S1505). When it is determined that the AR camera is connected, the processor 270 may apply an ADAS-AR conversion matrix (S1506). The processor 270 may match a coordinate system of the AR camera with a coordinate system of the camera of the object detection device 210. The processor 270 may display a frame of the AR camera (S1507). The processor 270 may display an AR graphic on the AR camera frame (S1509). When it is determined in Step S1505 that the AR camera is not connected, the processor 270 may display the ADAS camera frame (S1508). The processor 270 may display the camera frame of the object detection device 210 (S1508). The processor 270 may display the AR graphic on the camera frame of the object detection device 210 (S1509).

The present disclosure described above may be implemented as a computer-readable code on a medium in which a program is recorded. The computer-readable medium includes all types of recording devices that store data that can be read by a computer system. Examples of computer-readable media include hard disk drives (HDDs), solid state disks (SSDs), silicon disk drives (SDDs), ROMs, RAM, CD-ROMs, magnetic tapes, floppy disks, optical data storage devices, or the like, and include media implemented in forms of carrier waves (for example, transmission through the Internet). In addition, the computer may include a processor or a controller. Therefore, the detailed description above should not be construed as restrictive in all respects and should be considered as illustrative. A scope of the present disclosure should be determined by rational interpretation of the appended claims, and all changes within the equivalent scope of the present disclosure are included in the scope of the present disclosure.

DETAILED DESCRIPTION OF MAIN ELEMENTS

200: Vehicle user interface device

What is claimed is:

1. A user interface device for a vehicle comprising:

a display configured to display an indicator at a display area; and a controller operably connected to the display and configured to:

control the display to display a first indicator at a first portion of the display area, corresponding to a first point, the first point being located ahead of the vehicle at a location where an event of the vehicle is to occur, obtain distance data between the vehicle and the first point, and change the first indicator based on the distance data, wherein the controller is further configured to:

determine an accuracy condition of the first point based on sensor data from one or more sensors included in the vehicle, and based on the accuracy condition of the first point satisfying a predetermined first accuracy condition, correspondingly increase a size of the first indicator as the vehicle approaches the first point according to the distance data.

2. The user interface device of claim 1, wherein the controller is configured to, based on the vehicle approaching the first point according to the distance data, correspondingly move the first indicator in a direction indicated by the first indicator.

3. The user interface device of claim 1, wherein the accuracy condition of the first point indicates a probability of the event occurring at the first point.

4. The user interface device of claim 1, wherein the accuracy condition of the first point is determined further based on at least one of dilution of precision (DOP) data of Global Positioning System (GPS) or map data.

5. The user interface device of claim 4, wherein the controller is configured to:

determine the accuracy condition of the first point based on the map data by determining (i) the first point being a specific location provided in the map data and (ii) a probability of the event occurring at the specific location.

6. The user interface device of claim 1, wherein the controller is configured to:

based on the accuracy condition satisfying a predetermined second accuracy condition, increase a movement distance of the first indicator, and based on the accuracy condition not satisfying the predetermined second accuracy condition, decrease a movement distance of the first indicator.

7. The user interface device of claim 1, wherein the controller is further configured to, based on the accuracy condition satisfying a predetermined third accuracy condition, decrease a display height of the first indicator.

8. The user interface device of claim 1, wherein the controller is further configured to, based on no portions of the display area corresponding to the first portion, display the first indicator at a second portion of the display area different from the first portion.

9. The user interface device of claim 8, wherein the second portion corresponds to a second point located ahead of the vehicle and at which the first point is to occur.

10. The user interface device of claim 8, wherein the controller is configured to determine the second portion at a portion of the display area at which a straight line from the first point to a center of the display area intersects with an outer boundary of the display area.

11. The user interface device of claim 1, wherein the controller is further configured to:

based on the vehicle not moving in a direction away from a traveling direction of the vehicle at the first point according to steering data, decrease a moving speed of the first indicator, and based on the vehicle moving in the direction away from the traveling direction of the vehicle at the first point according to the steering data, increase a moving speed of the first indicator.

12. The user interface device of claim 1, wherein the controller is further configured to:

based on the vehicle moving right according to steering data, move the first indicator to left with respect to the first point, and based on the vehicle moving left according to steering data, move the first indicator to right with respect to the first point.

13. The user interface device of claim 1, wherein the controller is further configured to:

detect a first indicator display event including displaying the first indicator based on a route guide, change the first indicator based on movement of the vehicle on the route guide, and based on the first indicator display event being stopped, stop displaying the first indicator.

14. The user interface device of claim 1, wherein the controller is further configured to:

determine a traveling direction of the first point, determine a start point and an end point of the first indicator based on the traveling direction, update a direction and a moving distance indicated by the first indicator based on the start point and the end point, and determine a position of the first indicator and move and display the first indicator based on the updated direction and moving distance.

15. The user interface device of claim 1, wherein the controller is further configured to:

determine whether an augmented reality (AR) camera and an object detector are electrically connected to the vehicle, recognize a lane at which the vehicle is located using the object detector, match a coordinate system of the AR camera with a coordinate system of the object detector, and display the first indicator on a frame of the AR camera or an advanced driver assistance system (ADAS) camera frame.

16. The user interface device of claim 1, wherein the controller is further configured to, based on a speed of the vehicle satisfying a predetermined speed condition, increase a moving speed of the first indicator.

17. The user interface device of claim 1, wherein the controller is further configured to:

determine a traveling direction of the first point, determine a start point and an end point of the first indicator based on the determined traveling direction, and change a direction indicated by the first indicator from the start point to the end point.

18. The user interface device of claim 1, wherein the controller is further configured to, based on no portions of the display area corresponding to the first portion, control the display to display a second indicator at the display area indicating a point at which the first indicator is to be displayed.

19. The user interface device of claim 1, wherein the controller is further configured to:

recognize a lane at which the vehicle is located in a traveling road using an object detector included in the vehicle, determine whether a destination is located at the traveling road, and based on a determination that the destination is located at the traveling road, display a second indicator at a second portion of the display corresponding to an outer portion of the recognized lane of the traveling road.

20. The user interface device of claim 1, wherein the controller is configured to determine the first point based on at least one of Global Positioning System (GPS) data, at least one object data detected from image data, or a location of the vehicle according to map data.

21. The user interface device of claim 20, wherein the controller is configured to adjust a degree of change of the first indicator based on dilution of precision of the GPS data.

22. The user interface device of claim 1, wherein changing the first indicator includes adjusting a degree of change of the first indicator and changing a type of the change of the first indicator.

23. The user interface device of claim 22, wherein adjusting the first indicator includes adjusting a degree of change of the first indicator based on at least one of accuracy of the first point, data on a vanishing line, data on a curvature of a traveling road, or data regarding vehicle movement of the vehicle.

24. The user interface device of claim 1, wherein the controller is configured to determine a moving direction and a shape of the first indicator based on the sensor data.

25. The user interface device of claim 1, wherein the controller is further configured to:

based on input to change a moving direction of the first indicator being received, change the moving direction of the first indicator according to a direction indicated in the input, based on input to change a moving distance of the first indicator being received, adjust the moving distance of the first indicator according to a distance indicated in the input, and based on the input to change a display location height of the first indicator being received, change the display location of the first indicator according to a location indicated in the input.

26. The user interface device of claim 1, wherein the first indicator is an augmented reality (AR) graphic object, and wherein the display is configured to overlay the AR graphic object onto a windshield of the vehicle to thereby provide a blended view of the AR graphic object and real-world environment.

27. The user interface device of claim 1, wherein:

the first indicator indicates a traveling direction of the vehicle at the first point, and the controller is further configured to, based on the distance data being changed, change at least one of the size, a movement distance, and a moving direction of the first indicator.

28. The user interface device of claim 1, wherein the event includes changing a traveling direction of the vehicle.

29. The user interface device of claim 1, wherein the display is a head up display and includes a projector configured to output information at a windshield or a window of the vehicle.

30. The user interface device of claim 1, wherein the accuracy condition is determined further based on at least one of a vanishing line or a curvature of a traveling road.

31. The user interface device of claim 30, wherein the controller is configured to, based on the vanishing line being located above a centerline of the display area, increase at least one of the size, a moving speed, a movement distance, or a location of the first indicator.

32. The user interface device of claim 30, wherein the controller is configured to, based on the curvature of the traveling road satisfying a predetermined condition, increase at least one of the size, a moving speed, a movement distance, or a location of the first indicator.

33. The user interface device of claim 30, wherein the controller is further configured to, based on the accuracy condition of the first point satisfying the predetermined first accuracy condition, increase at least one of a moving speed, a movement distance, or a location of the first indicator.

34. The user interface device of claim 1, wherein the first indicator includes a symbol indicating a direction from the vehicle to the first point.

* * * * *